US012725248B2

(12) United States Patent
Sahu et al.

(10) Patent No.: US 12,725,248 B2
(45) Date of Patent: Sep. 1, 2026

(54) METHODS OF TOBACCO CLASSIFICATION VIA HYPERSPECTRAL IMAGING

(71) Applicant: Altria Client Services LLC, Richmond, VA (US)

(72) Inventors: Amrita Sahu, Richmond, VA (US); Evan Haase, Hencrico, VA (US); Henry Dante, Midlothian, VA (US); Maurice Stancil, Washington, DC (US); William C Wilkinson, Powhatan, VA (US); Austin Hayes, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 285 days.

(21) Appl. No.: 18/462,793

(22) Filed: Sep. 7, 2023

(65) Prior Publication Data

US 2025/0086782 A1 Mar. 13, 2025

(51) Int. Cl.
*G06T 7/00* (2017.01)

(52) U.S. Cl.
CPC .... *G06T 7/001* (2013.01); *G06T 2207/10048* (2013.01); *G06T 2207/20081* (2013.01)

(58) Field of Classification Search
CPC ........... G06T 7/001; G06T 2207/10048; G06T 2207/20081; G06V 10/25; G06V 10/58; G06V 10/22
See application file for complete search history.

(56) References Cited

U.S. PATENT DOCUMENTS 5,476,108 A 12/1995 Dominguez et al.
8,953,158 B2 2/2015 Moshe et al.
9,885,702 B1 2/2018 Farmen et al.
9,886,631 B2 2/2018 Dante et al.
10,197,504 B2 2/2019 Sahu et al.
10,292,352 B2 * 5/2019 de Godoy Lusso ..... C12N 5/04
10,405,571 B2 9/2019 Adams et al.
11,250,261 B2 2/2022 Dante et al.
2009/0087033 A1 * 4/2009 Chao ...................... A22B 5/007 382/110
2012/0250025 A1 * 10/2012 Moshe .................. G01N 21/85 356/451
2014/0137877 A1 * 5/2014 Deevi ..................... B07C 5/366 356/303
2016/0138975 A1 * 5/2016 Ando ........................ G01J 3/28 356/416

(Continued)

FOREIGN PATENT DOCUMENTS

CN 110479635 A 11/2019
CN 112697726 A 4/2021

(Continued)

OTHER PUBLICATIONS

Divyanth et al.; "Non-destructive Prediction of Nicotine Content in Tobacco Using Hyperspectral Image-Derived Spectra and Machine Learning"; Journal of Biosystems Engineering; Published Mar. 18, 2022 (Year: 2022).*

(Continued)

*Primary Examiner* — Aaron W Carter

(74) *Attorney, Agent, or Firm* — Harness, Dickey & Pierce, P.L.C.

(57) ABSTRACT

Methods of classifying tobacco include imaging tobacco with an imaging system to obtain an image and classifying the tobacco as very low nicotine (VLN) or traditional based on the obtained image. The imaging system includes a hyperspectral camera and an image processing system.

19 Claims, 18 Drawing Sheets

(56) References Cited

U.S. PATENT DOCUMENTS

| | | | | |
|---|---|---|---|---|
| 2017/0260535 | A1* | 9/2017 | Xu | C12N 15/8261 |
| 2018/0100810 | A1* | 4/2018 | Sahu | G01N 21/94 |
| 2019/0078112 | A1* | 3/2019 | Xu | C12N 15/8218 |
| 2023/0023641 | A1* | 1/2023 | Rosenfeld | G06V 10/60 |
| 2023/0027514 | A1* | 1/2023 | Ma | G06T 7/181 |
| 2023/0263232 | A1* | 8/2023 | Fuemmeler | G16H 40/67<br>131/329 |
| 2023/0368487 | A1* | 11/2023 | Kariatsumari | G06V 10/58 |
| 2024/0264088 | A1* | 8/2024 | Gupta | G01N 21/94 |
| 2024/0296569 | A1* | 9/2024 | Kato | G06T 7/215 |
| 2024/0371124 | A1* | 11/2024 | Habili | G06T 7/90 |
| 2024/0422443 | A1* | 12/2024 | Yugawa | G01J 3/10 |
| 2025/0037312 | A1* | 1/2025 | Huang | G06T 7/80 |
| 2025/0086782 | A1* | 3/2025 | Sahu | G06T 7/001 |

FOREIGN PATENT DOCUMENTS

| | | | |
|---|---|---|---|
| CN | 113591738 | A | 11/2021 |
| CN | 215270539 | U | 12/2021 |
| DE | 102014223158 | A1 | 5/2016 |
| WO | WO-2019162831 | A1 | 8/2019 |
| WO | WO-2020245798 | A1 | 12/2020 |
| WO | 2024188619 | A1 | 9/2024 |

OTHER PUBLICATIONS

Dou et al.; "Estimation of Nicotine Content in Tobacco Leaves Based on Hyperspectral Imaging" (Year: 2017).*

Soares et al.; "Inline simultaneous quantitation of tobacco chemical composition by infrared hyperspectral image associated with chemometrics" (Year: 2019).*

International Search Report and Written Opinion Corresponding to Application No. PCT/US2024/042633, mailed Nov. 7, 2024.

Third Party Observation Corresponding to Application No. PCT/US2024/042633, mailed Mar. 26, 2025.

International Preliminary Report on Patentability Corresponding to International Patent Application No. PCT/US2024/042633, mailed Mar. 11, 2026.

* cited by examiner

2100

| FIRST SET OF DATA (160 BANDS) | | SECOND SET OF DATA (270 BANDS) | |
|---|---|---|---|
| INDEX | WAVELENGTH (nm) | INDEX | WAVELENGTH (nm) |
| 136 | 2232.5 | 228 | 2252.1 |
| 137 | 2242.1 | 227 | 2246.1 |
| 134 | 2213.2 | 94 | 1450.8 |
| 143 | 2300.0 | 84 | 1391.0 |
| 146 | 2329.9 | 173 | 1923.2 |
| 81 | 1701.7 | 139 | 1719.9 |
| 82 | 1711.4 | 138 | 1713.9 |
| 48 | 1383.3 | 144 | 1749.8 |
| 45 | 1354.4 | 140 | 1725.9 |
| 51 | 1412.3 | 165 | 1875.4 |

METHODS OF TOBACCO CLASSIFICATION VIA HYPERSPECTRAL IMAGING

FIELD

The present disclosure relates to classification of tobacco through the use of hyperspectral imaging and analysis.

BRIEF SUMMARY

New and useful systems, apparatuses, and methods for classifying tobacco are described herein.

In at least one example embodiment, a method of classifying tobacco is described. The method may include imaging tobacco with an imaging system to obtain an image and classifying the tobacco as very low nicotine (VLN) or traditional based on the obtained image. The imaging system may include a hyperspectral camera and an image processing system.

In at least one example embodiment, the method may further include placing the tobacco on a conveyor belt configured to pass underneath the hyperspectral camera. In at least one example embodiment, the imaging the tobacco may occur while the tobacco is moved linearly underneath the hyperspectral camera via the conveyor belt. The movement of the tobacco may be tracked by the image processing system to generate a consistent image of the tobacco. In at least one example embodiment, the classifying the tobacco may include analyzing the image in real time as the tobacco is moved linearly underneath the hyperspectral camera.

In at least one example embodiment, the hyperspectral camera may be configured to image the tobacco with short wave infrared imaging. In at least one example embodiment, the SWIR imaging may operate between about 900 nanometers (nm) and about 2500 nm.

In at least one example embodiment, relevant features of the tobacco may be extracted from the obtained image.

In at least one example embodiment, the classifying may be performed by a machine learning algorithm. In at least one example embodiment, the machine learning algorithm may be at least one of logistic regression or linear discriminant analysis. In at least one example embodiment, the method may further include training the machine learning algorithm via a plurality of images of tobacco with a known classification of VLN tobacco or traditional tobacco.

In at least one example embodiment, the hyperspectral camera may image the tobacco to construct a two-dimensional image of a surface of the tobacco for each of the spectral wavelengths.

In at least one example embodiment, the image may include a plurality of pixels. Each of the plurality of pixels may contain a plurality of spectral measurements. In at least one example embodiment, each of the plurality of pixels may contain at least 160 spectral measurements.

In at least one example embodiment, the classifying the tobacco as VLN or traditional may be non-invasive.

In at least one example embodiment, a rectangular area of the tobacco may be imaged by the hyperspectral camera. In at least one example embodiment, the rectangular area may be about a 12" by 30" area of the tobacco.

In at least one example embodiment, the method may further include placing a reflectance material on the tobacco for use in preprocessing. In at least one example embodiment, the method may further include defining a region of interest for the reflectance material, defining a second region of interest for the tobacco, and after the image is obtained by the hyperspectral camera, removing pixels with too low of a response within the second region of interest. In at least one example embodiment, the method may further include creating a mean spectral vector for each pixel along an x-axis of the first region of interest by averaging the first region of interest along a y-axis corresponding to each pixel along the x-axis. In at least one example embodiment, the method may further include correcting each of the pixels within the second region of interest with the mean spectral vector to create a mean spectra for the tobacco. In at least one example embodiment, the tobacco may be classified as VLN or traditional based on the mean spectra of the tobacco. In at least one example embodiment, the correcting each of the pixels within the second region of interest may include discarding a pixel of the second region of interest if there is no corresponding element of the mean spectral vector. In at least one example embodiment, the reflectance material may include a suitable reflectance. In at least one example embodiment, the reflectance material may be a SPECTRALON® 40% reflectance standard material.

Also described herein is a method of analyzing tobacco. The method may include imaging tobacco with a hyperspectral camera to obtain an image and analyzing the obtained image to quantify an amount of nicotine in the tobacco.

Also described herein is a method of quantifying at least one chemical constituent in tobacco. The method may include imaging tobacco with a hyperspectral camera to obtain an image and analyzing the image to quantify an amount of the at least one chemical constituent.

In at least one example embodiment, the at least one chemical constituent may be at least one of propylene-glycol or glycerin.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DESCRIPTION OF EXAMPLE EMBODIMENTS

Figure 1:
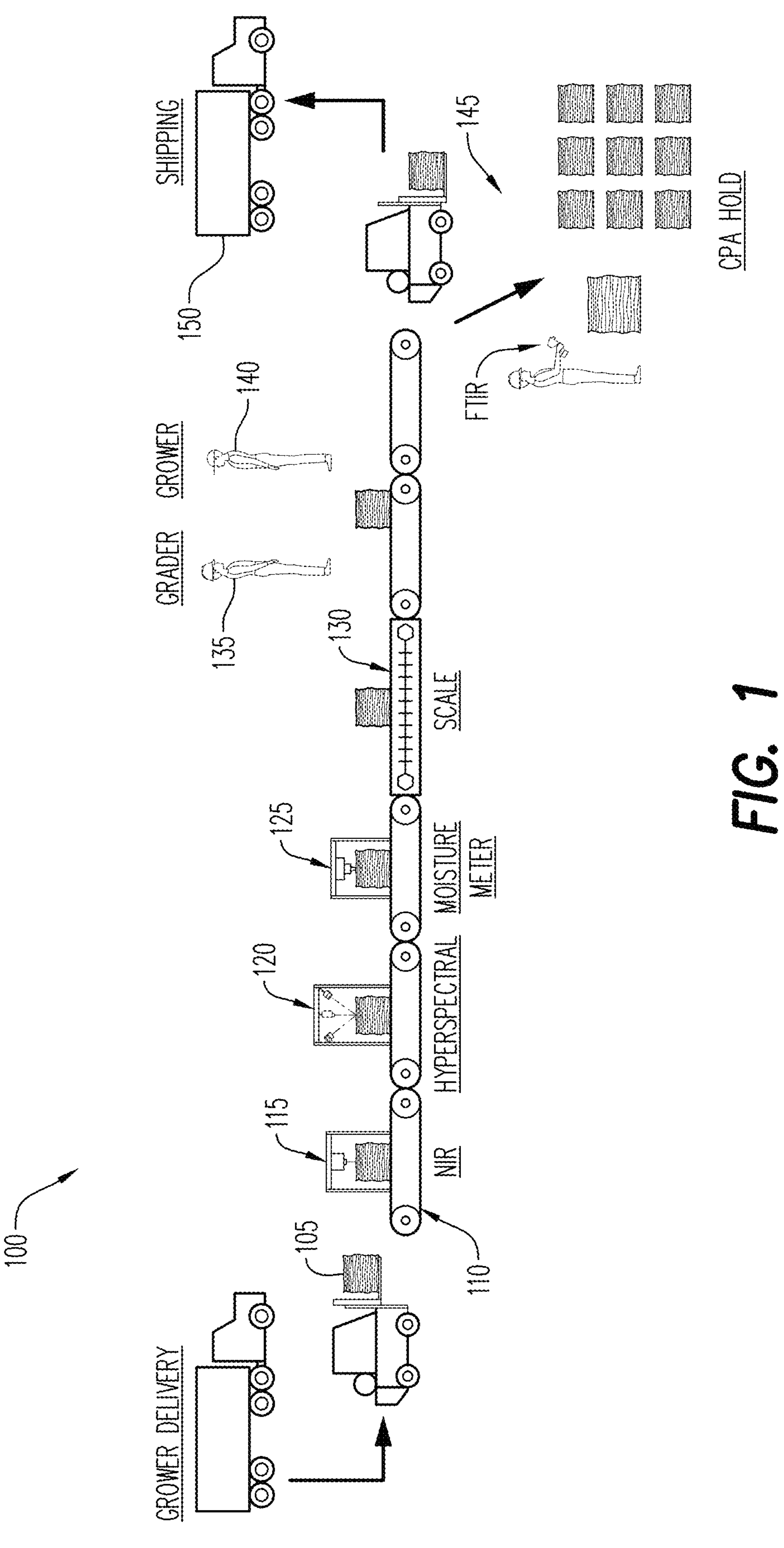
FIG. 1 is a diagram of a method of imaging and analyzing tobacco via hyperspectral imaging according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on." "directly connected to," or "directly coupled to" another element or layer, there are no intervening elements or layers present. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below." "lower." "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a." "an." and "the" are intended to include the plural forms as well, unless the context clearly indicates otherwise. It will be further understood that the terms "includes," "including." "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about,"

"generally." or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. For example, when an elastic layer and a support layer are removably coupled to one another, the elastic layer and the support layer can be separated upon the application of sufficient force.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and/or executing instructions in a defined manner.

As a means of illustration, the system will be described for application during tobacco processing and product development, but substantially the same system could be applied during the processing and product development of other agricultural products. Tobacco is packaged in the form of tobacco bales, graded and purchased from growers. A tobacco bale is a large, substantially rectangular shaped package of tobacco leaves and stems, tightly bound with a strong cord or wire or loosely packed in boxes. A typical Burley or Virginia tobacco bale may have dimensions on the order of at least about 1.2 meters per side and a corresponding volume on the order of about 1.7 cubic meters.

In hyperspectral imaging, a field of view of a sample is scanned and imaged while the sample is exposed to electromagnetic radiation. During the hyperspectral scanning and imaging there is generated and collected relatively large numbers of multiple spectral images, one-at-a-time, but, in an extremely fast sequential manner of the objects emitting electromagnetic radiation at a plurality of wavelengths and frequencies, where the wavelengths and frequencies are associated with different selected portions or bands of an entire hyperspectrum emitted by the objects. A hyperspectral imaging and analysis system can be operated in an extremely rapid manner for providing exceptionally highly resolved spectral and spatial data and information of an imaged sample of matter, with high accuracy and high precision, which are fundamentally unattainable by using standard spectral imaging and analysis.

In general, when electromagnetic radiation in the form of light, such as that used during hyperspectral imaging, is incident upon an object, the electromagnetic radiation is affected by one or more of the physical, chemical, and/or biological species or components making up the object, by any combination of electromagnetic radiation absorption, diffusion, reflection, diffraction, scattering, and/or transmission mechanisms. Moreover, an object whose composition includes organic chemical species or components, ordinarily exhibits some degree of fluorescent and/or phosphorescent properties, when illuminated by some type of electromagnetic radiation or light, such as ultra-violet (UV), visible (VIS), or infrared (IR), types of light. The affected electromagnetic radiation, in the form of diffused, reflected, diffracted, scattered, and/or transmitted, electromagnetic radiation emitted by the object is directly and uniquely related to the physical, chemical, and/or biological properties of the object, in general, and of the chemical species or components making up the object, in particular, and therefore represents a unique spectral fingerprint or signature pattern type of identification and characterization of the object.

A typical spectral imaging system consists of an automated measurement system and analysis software. The automated measurement system includes optics, mechanics, electronics, and peripheral hardware and software, for irradiating, typically using an illuminating source, a scene or sample, followed by measuring and collecting light emitted, for example, by fluorescence, from objects in the scene or sample, and for applying calibration techniques best suited for extracting desired results from the measurements. Analysis software includes software and mathematical algorithms for analyzing, displaying, and presenting, useful results about the objects in the scene or sample in a meaningful way.

The hyperspectral image of a scene or a sample could be obtained from commercially available hyperspectral imaging cameras or custom built hyperspectral imaging cameras according to the user's needs.

Each spectral image is a three dimensional data set of voxels (volume of pixels) in which two dimensions are spatial coordinates or position, (x, y), in an object and the third dimension is the wavelength, (A), of the emitted or reflected light of the object, such that coordinates of each voxel in a spectral image may be represented as (x, y, A). Any particular wavelength, (A), of imaged light of the object is associated with a set of spectral images each featuring spectral fingerprints of the object in two dimensions, for example, along the x and y directions, whereby voxels having that value of wavelength constitute the pixels of a monochromatic image of the object at that wavelength. Each spectral image, featuring a range of wavelengths of imaged light of the object is analyzed to produce a two dimensional map of one or more physicochemical properties, for example, geometrical shape, form, or configuration, and dimensions, and/or chemical composition, of the object and/or of components of the object, in a scene or sample.

In hyperspectral imaging, multiple images of each object are generated from object emitted or reflected electromagnetic radiation having wavelengths and frequencies associated with different selected parts or bands of an entire spectrum emitted or reflected by the object. For example, hyperspectral images of an object are generated from object emitted/reflected electromagnetic radiation having wavelengths and frequencies associated with one or more of the following bands of an entire spectrum emitted/reflected by the object: the visible band, spanning the wavelength range of about 400-700 nanometers, the infra-red band, spanning the wavelength range of about 700-3000 nanometers, and the deep infra-red band, spanning the wavelength range of about 3-12 microns. If proper wavelengths and wavelength ranges are used during hyperspectral imaging, data and information of the hyperspectral images could be optimally used for detecting and analyzing by identifying, discriminating, classifying, and quantifying, the imaged objects and/or materials, for example, by analyzing different signature spectra present in pixels of the hyperspectral images.

A high speed hyperspectral imaging system is often required for different types of repeatable and non-repeatable chemical and physical processes taking place during the sub-100 millisecond time scale, which cannot, therefore, be studied using regular hyperspectral imaging techniques. Combustion reactions, impulse spectra-electrochemical experiments, and inelastic polymer deformations, are examples of such processes. Remote sensing of objects in distant scenes from rapidly moving platforms, for example, satellites and airplanes, is another example of a quickly changing observable that is often impossible to repeat, and therefore requires high speed hyperspectral imaging.

Referring to FIG. 1, a process 100 of imaging a tobacco bale 105 is shown. The tobacco bale 105 may be loaded onto a conveyor belt 110 after it is received from a grower delivery. The conveyor belt 110 may include rollers that are configured to move the tobacco bale 105. As the conveyor belt 110 moves, the tobacco bale 105 passes under a near infrared (NIR) source 115 and a hyperspectral camera 120. Additional details will be discussed below with respect to NIR hyperspectral imaging of the tobacco bale 105. After the tobacco bale 105 passes under the hyperspectral camera 120, the tobacco bale 105 may additionally pass under and/or over a moisture meter 125 and a weigh scale 130 before being inspected by a grader 135 and/or grower 140. The moisture meter 125 may be a commercially available moisture meter. The tobacco bale 105 may then be moved from the conveyor belt 110 to a crop protections agent (CPA) hold 145 or a shipping container 150.

Figure 2:
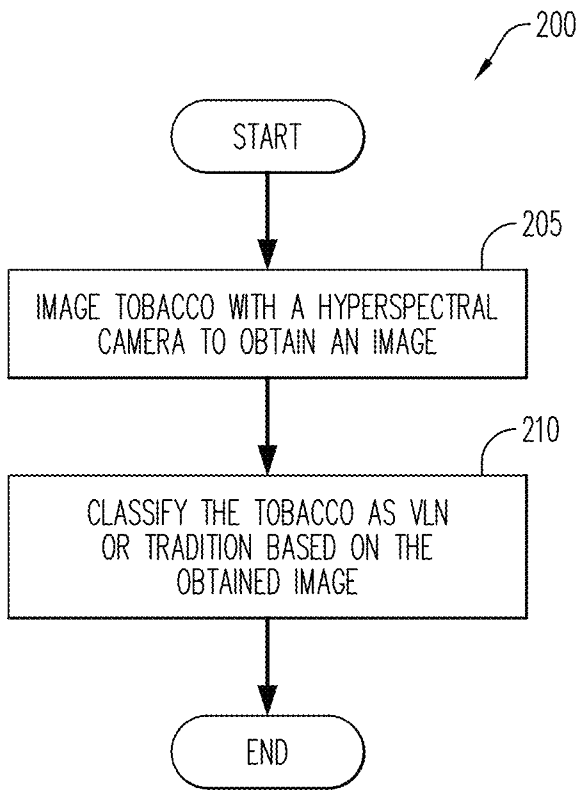
FIG. 2 is a flow chart of a method of classifying tobacco as very low nicotine (VLN) tobacco or traditional tobacco via hyperspectral imaging according to an example embodiment.

Referring to FIG. 2, a flow chart of a method 200 of classifying tobacco is shown. In some embodiments, the tobacco to be classified may be in the form of a bale such as the tobacco bale 105. In other embodiments, the tobacco to be classified may be in a form other than a bale. The method 200 may start when the tobacco is loaded onto the conveyor belt 110 to be imaged. At step 205 the tobacco is imaged with the hyperspectral camera 120. An image of the tobacco may be obtained at the step 205 by the hyperspectral camera 120. After the image of the tobacco is obtained, the tobacco is classified at step 210. The tobacco may be classified as very-low nicotine (VLN) or traditional based on the obtained image. The classification of the tobacco may be performed by an image processing system which may include at least a processor and a memory.

Figure 3:
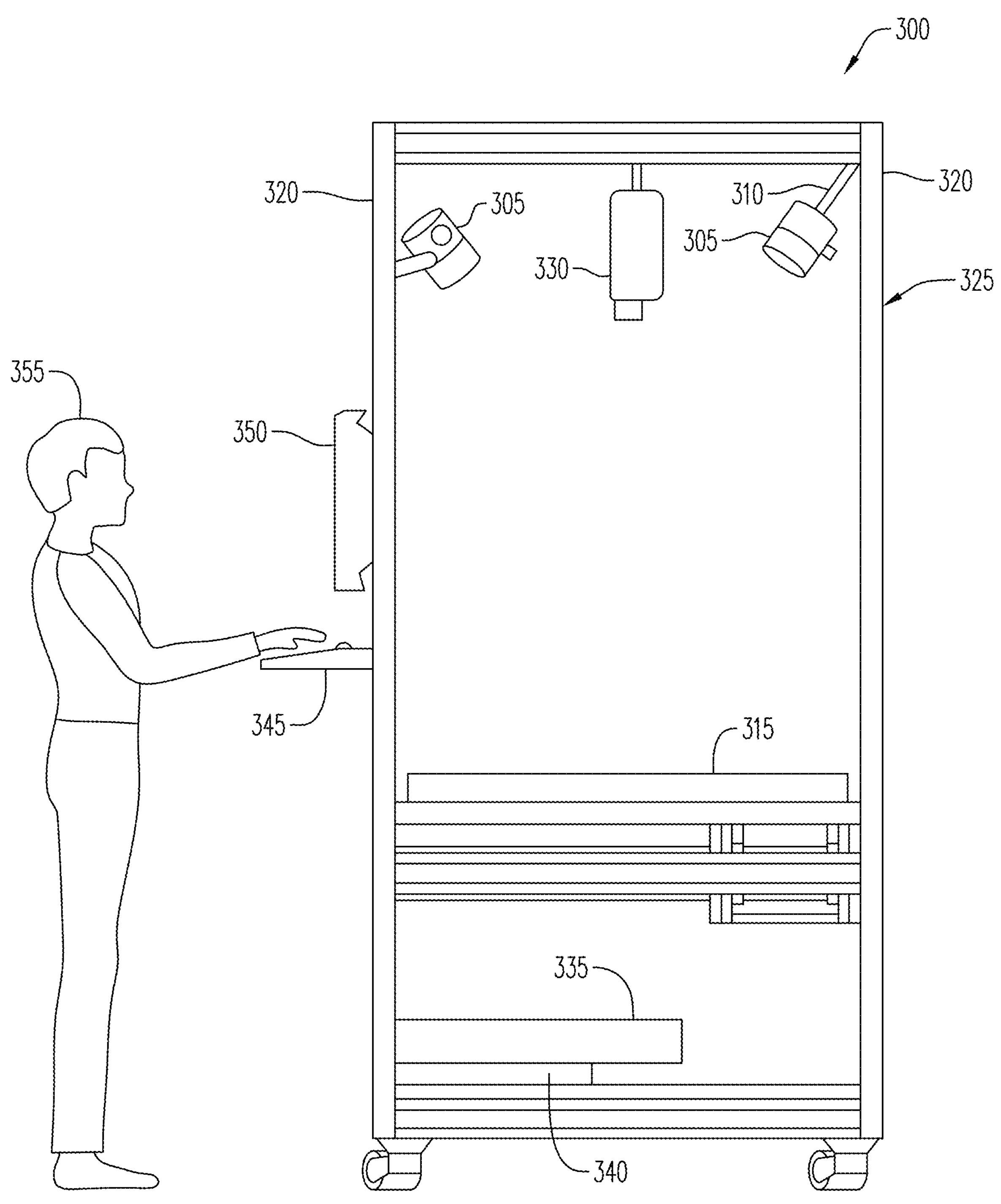
FIG. 3 is a side view of an example system for imaging and analyzing tobacco via hyperspectral imaging according to an example embodiment.

FIG. 3 shows a system 300 that may employ hyperspectral imaging and analysis of the tobacco bale 105. The system 300 may be the image processing system and may include at least one light source 305 for providing light during an imaging process. In some embodiments, the at least one light source 305 may be mounted on an arm 310 for positioning the at least one light source 305 relative to the tobacco bale 105 when the tobacco bale 105 is positioned on a platform 315 which may be part of the conveyor belt 110. In some embodiments, the arm 310 may be mounted to a frame 320 of a cabinet 325. The arm 310 may either be fixed or moveably positioned on the frame 320 of the cabinet 325.

In at least one example embodiment, the at least one light source 305 may provide a beam of electromagnetic radiation at one or more wavelengths. In some embodiments, the at least one light source 305 may be a tungsten, halogen, mercury, ultraviolet, or a xenon light source.

The system 300 may additionally include a hyperspectral camera 330. In some embodiments, the hyperspectral camera 330 may be analogous to or the same as the hyperspectral camera 120 described above. The hyperspectral camera 330 may be configured to image the tobacco bale 105 when the tobacco bale 105 is positioned on the platform 315 underneath the hyperspectral camera 330.

The system 300 may additionally include a computer 335 having a processor and memory capable of rapidly handling system data. In some example embodiments, the computer 335 may be configured to classify the tobacco bale 105 as VLN or traditional. The computer 335 may control the operation of the system 300 and positioning of elements of the system 300 such as the at least one light source 305 and the hyperspectral camera 330. A power source 340 for providing an uninterrupted source of power to the computer 335 may be provided, such devices readily available from a variety of commercial sources. As is conventional, the computer 335 may also include a keyboard 345 and monitor 350 to enable input and system monitoring by a user 355. The power source 340 may be provided to assure that a tightly controlled source of power is supplied to system 300.

Figure 4:
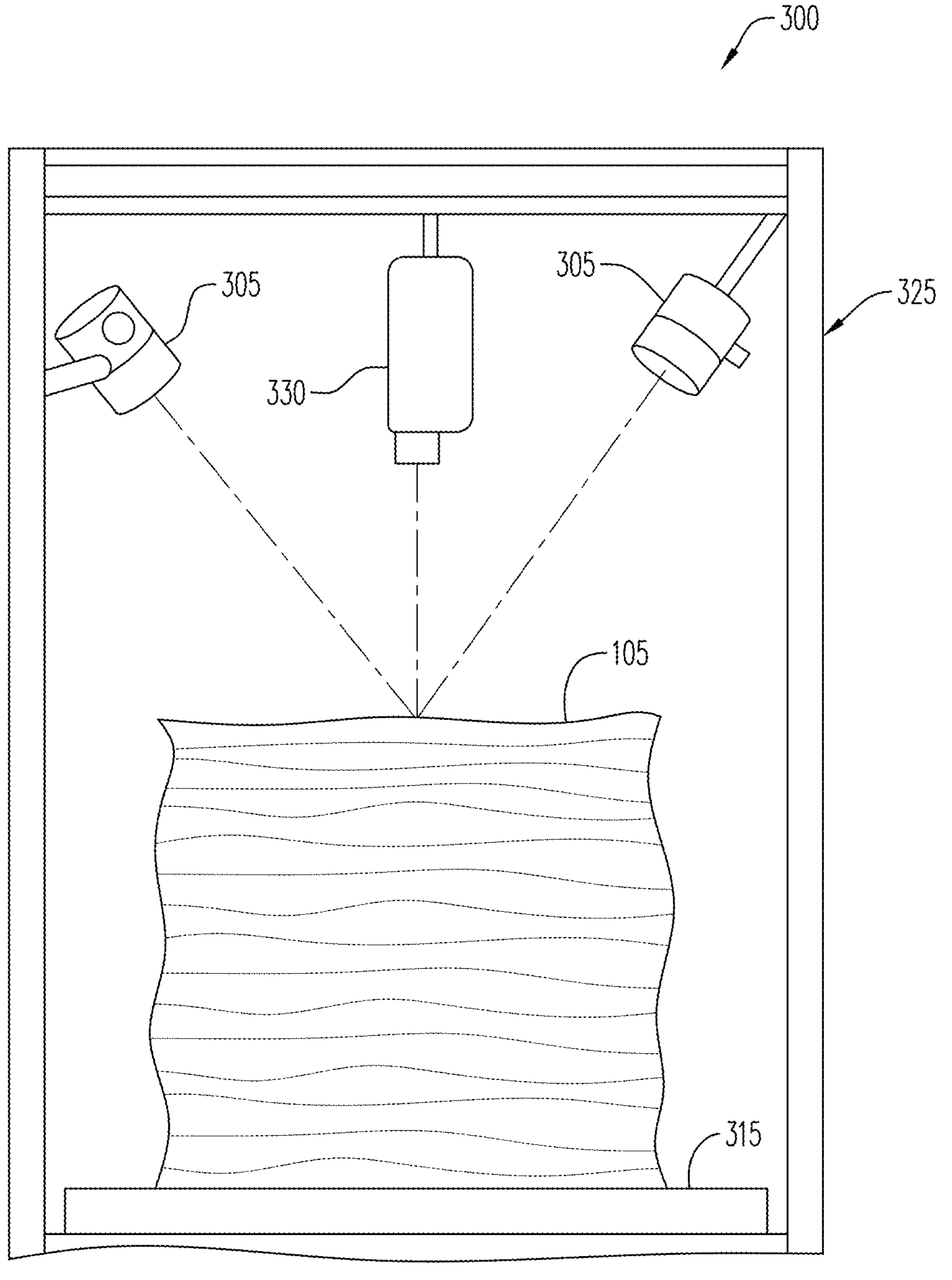
FIG. 4 is a side view of an apparatus of the system of FIG. 3 used to image tobacco via hyperspectral imaging according to an example embodiment.

Referring to FIG. 4, the system 300 is shown with the tobacco bale 105 positioned within the cabinet 325. The at least one light source 305 may be two light sources and the hyperspectral camera 330 may be positioned above the tobacco bale 105 and may be configured to image at least a portion of the tobacco bale 105. Additional details of the imaging and the classification of tobacco are described below with reference to FIGS. 5, 6A, and 6B.

Figure 5:
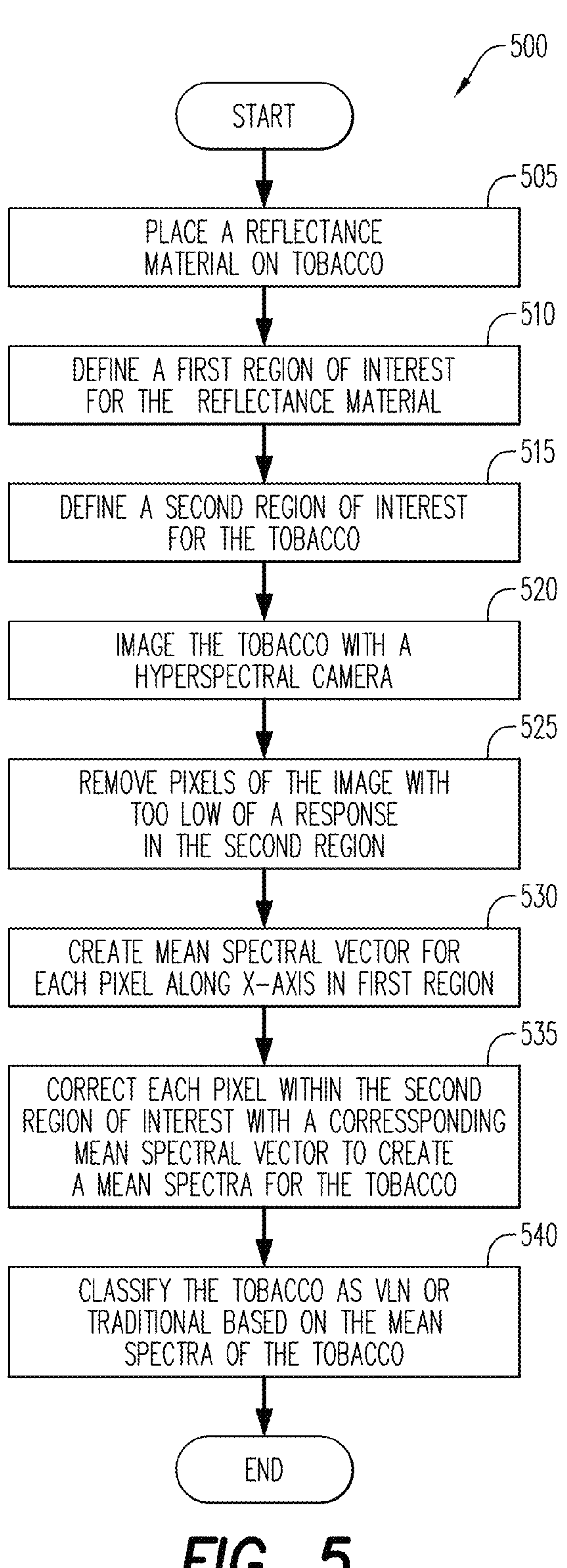
FIG. 5 is a flow chart of a method of classifying tobacco as very low nicotine (VLN) tobacco or traditional tobacco via hyperspectral imaging according to an example embodiment.
Figure 6A:
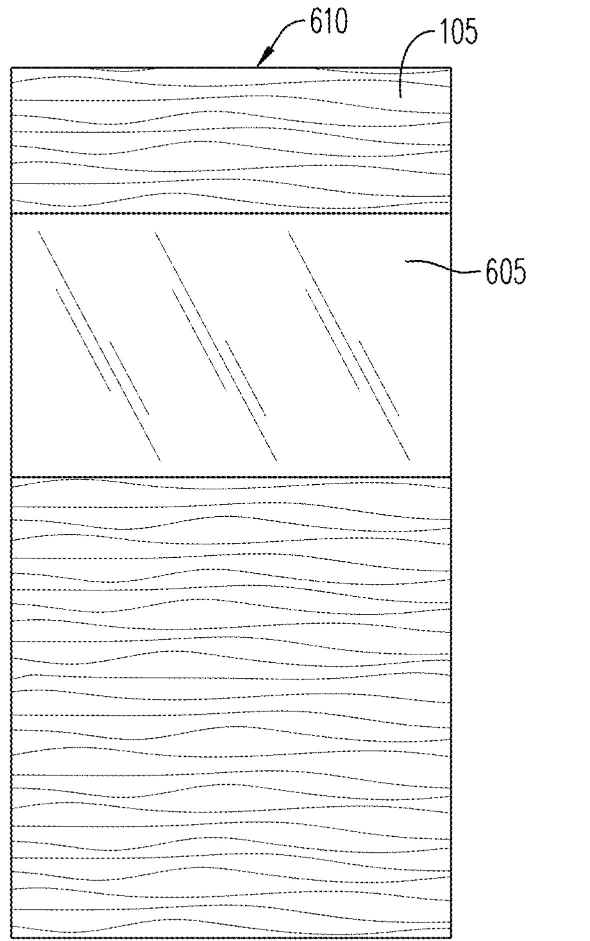
FIGS. 6A and 6B are images of a surface of a tobacco bale including a reflectance material for imaging the tobacco via hyperspectral imaging according to an example embodiment.

Referring to FIG. 5, a flow chart of a method 500 of imaging and classifying tobacco is shown. The method 500 may describe the method 200 in additional detail. In at least one example embodiment, the method 500 may be performed by the image processing system described above. At step 505, a reflectance material may be placed on the tobacco. In at least one example embodiment, the tobacco may be the tobacco bale 105 and the reflectance material may be a SPECTRALON® reflectance material. The reflectance material may be placed on the tobacco by a person such as the grader 135 or may be placed on the tobacco by a machine or implement of the system 300. A reflectance material 605 is shown placed on a rectangular area 610 of the tobacco bale 105 in FIG. 6A. In some embodiments, the reflectance material 605 may be a material with a SPECTRALON® 40% reflectance standard.

Figure 6B:
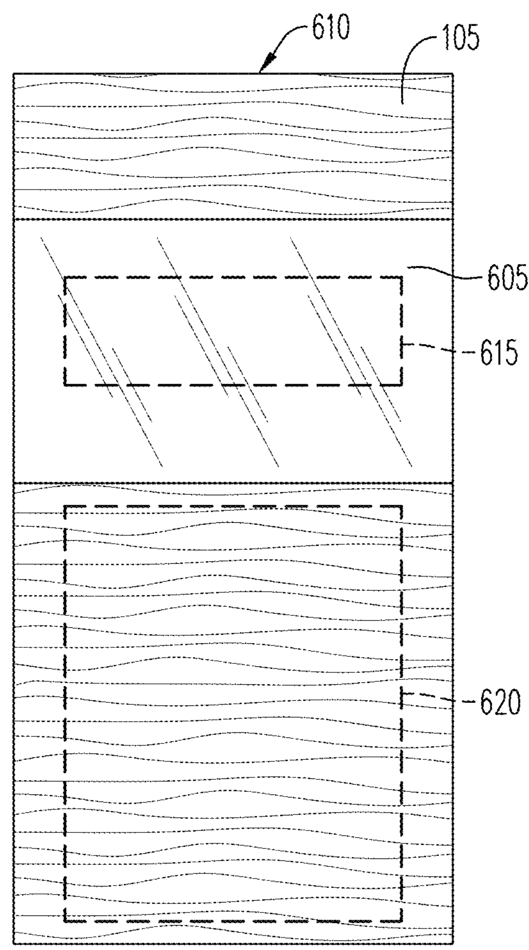

After the reflectance material 605 is placed on the tobacco bale 105, a first region of interest may be defined in step 510 by the processor of the image processing system. In at least one example embodiment, the image processing system may be a computer system such as the computer 335 of FIG. 3. As shown in FIG. 6B, the first region of interest 615 may be a portion of the reflectance material 605 that is placed on the tobacco.

Referring back to FIG. 5, at step 515 a second region of interest may be defined by the processor. As shown in FIG. 6B, the second region of interest 620 may be a region or a portion of the tobacco that does not include the reflectance material 605.

At step 520, the tobacco may be imaged with the hyperspectral camera 330. In some embodiments, the at least one light source 305 may be illuminated while the tobacco is imaged by the hyperspectral camera 330. In some embodiments, the hyperspectral camera 330 may be configured to image the rectangular area 610 of the tobacco. In at least one example embodiment, the rectangular area 610 may be approximately a 12 inch by 30 inch area of the tobacco. Both the first region of interest 615 and the second region of interest 620 may be located within the rectangular area 610 of the tobacco.

As the tobacco moves linearly underneath the hyperspectral camera 330, a single line of an image is obtained. The hyperspectral camera 330 obtains a single line of an image repeatedly as the tobacco moves under the camera until the rectangular area 610 is completely imaged. These single line images may be combined by the processor to create a hyperspectral image of the tobacco. The hyperspectral image may be a two-dimensional image of a surface of the tobacco for each of the spectral wavelengths captured by the hyperspectral camera. The image processing system may additionally track the movement of the tobacco on the conveyor belt under the hyperspectral camera to ensure that a consistent image is obtained by the hyperspectral camera. The hyperspectral image may be referred to herein as an image or as an image obtained by a hyperspectral camera. In at least one example embodiment, the image may undergo preprocessing that may remove the first four and the final four spectral bands, which may reduce the total number of spectral bands of the image. For example, the total number of spectral bands may be reduced from 168 to 160. The process of obtaining the image from the hyperspectral camera is known by those skilled in the art.

The imaging of the tobacco bale 105 by the hyperspectral camera 330 may additionally result in an image that includes a reflection spectral grading signature and a spectral chemical signature. As may be appreciated by those skilled in the art, each pixel captured by the hyperspectral camera 330 may contain a plurality of spectral measurements such as about 160 or more spectra points or measurements at different wavelengths for the tobacco. In some embodiments, during imaging, the hyperspectral camera 330 may provide a three-dimensional hyperspectral image cube on the order, but not limited to, 640 pixels by 1024 pixels. The image obtained by the hyperspectral camera may include relevant features that may be extracted to perform analysis of the hyperspectral image. In some embodiments, the different wavelengths may be in a shortwave infrared range of the electromagnetic spectrum such that the wavelengths are between about 900 nm and 2500 nm. To image the tobacco in the shortwave infrared range of the electromagnetic spectrum, a shortwave infrared imaging camera may be used or a camera with a spectral response including the shortwave infrared region of the electromagnetic spectrum may be used.

At step 525, the second region of interest of the image may be analyzed by the processor to remove pixels with a response value less than a threshold response value. In some embodiments, this process may be known as dark subtraction. If a pixel within the second region of interest 620 has a response value less than a threshold response value due to shadowing on the surface of the tobacco, that pixel may be removed from any further analysis of the tobacco.

At step 530, a mean spectral vector is created by the processor for each pixel along an x-axis in the first region of interest 615 of the image. The mean spectral vector may be created for a given pixel along the x-axis by averaging pixels along a y-axis corresponding to the given pixel After the mean spectral vector is created for each pixel along the x-axis of the first region of interest 615, the processor may correct each pixel of the second region of interest 620 with a corresponding mean spectral vector. To correct a pixel of the second region of interest 620, the pixel is divided by the mean spectral vector for the corresponding point on the x-axis of the first region of interest 615. If a pixel of the second region of interest 620 was discarded at the step 525, that pixel is not corrected and remains discarded. Once each remaining pixel of the second region of interest 620 has been corrected, each of the pixels of the second region of interest are averaged and then normalized to create a mean spectra for the tobacco.

At step 540, the tobacco may be classified based on the mean spectra of the tobacco by the processor. In at least one embodiment, the tobacco may be classified as either very low nicotine (VLN) tobacco or traditional tobacco based on the mean spectra.

The method 500 may be a non-invasive way to classify tobacco. The method 500 may allow tobacco to be classified in real time and may allow easy verification of a classification of tobacco. For example, if a shipment of tobacco is received, it may be classified by the person or entity that shipped the tobacco. The method 500 may allow the received tobacco to be easily and efficiently analyzed to determine if the classification performed by the shipping entity is accurate. The method 500 may also be used to classify tobacco that is not previously classified such that the tobacco is sold, marketed, and/or used based on the classification. The classification performed by the method 500 may ensure that tobacco is accurately priced and identified for any future uses and may also allow tobacco to be shipped, stored, and/or used in tobacco products with confidence that the tobacco is accurately classified as VLN tobacco or traditional tobacco.

Figures 7, 8:
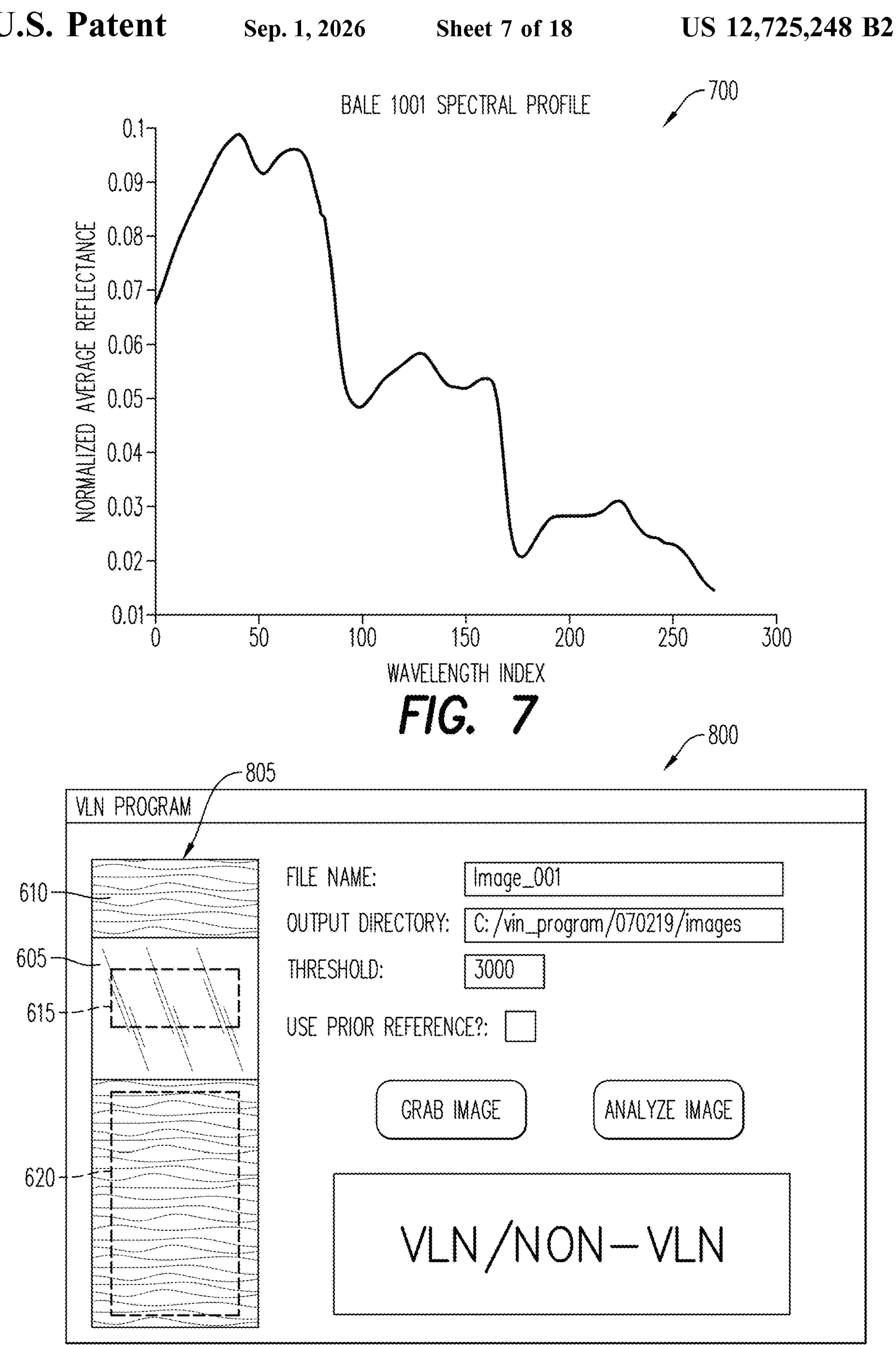
FIG. 7 is a graph of a spectral profile of a tobacco bale according to an example embodiment.
FIG. 8 is a graphical user interface that may implement a machine learning algorithm to classify tobacco as VLN tobacco or traditional according to an example embodiment.

Referring to FIG. 7, a chart 700 of a spectral profile of a tobacco bale is shown. The chart 700 includes a wavelength index along an x-axis and a normalized average reflectance along a y-axis. The spectral profile of the tobacco bale is the normalized average reflectance at each wavelength imaged by a hyperspectral camera.

FIG. 8 shows a graphical user interface (GUI) 800 of a software program that may be used to implement at least a portion of the method 500 of FIG. 5. The GUI 800 may be output on a display such as the monitor 350 of the computer 335. The GUI 800 may be configured to receive input via input devices coupled to the computer 335 such as the keyboard 345 and may operate via the processor and memory of the computer 335.

The GUI 800 may show an image 805 that may have been captured by a hyperspectral camera. In at least one example embodiment, the image 805 may capture the rectangular area 610 that may include the first region of interest 615 and the second region of interest 620. The GUI 800 may additionally include information fields such as a file name, an output directory, and a threshold. The threshold may be the threshold to determine if a pixel is to be discarded from the second region of interest 620. For example, as described with respect to step 525 of FIG. 5, a pixel may be discarded as a shadow or as a dark pixel. The GUI 800 may additionally include an option to use a prior reference. A prior reference that may include the first region of interest 615 may be used on a subsequent image of tobacco that may not include a first region of interest with the reflectance material 605.

The GUI 800 may include options that allow a user to grab an image and to analyze an image. If a user selects the option to grab an image, the user may instruct a system such as the system 300 to utilize the hyperspectral camera to obtain an image of tobacco. If a user selects the option to analyze the image, the user may instruct the system to analyze a captured image to determine information about the image. For example, analyzing the image may include determining if the tobacco consists of VLN tobacco or traditional tobacco. The GUI may be configured to output a categorization of the tobacco which may be whether the tobacco is VLN tobacco or traditional tobacco. The GUI 800 may be configured to allow a grader or analyst to classify tobacco efficiently and easily.

In at least one example embodiment, classifying the tobacco as VLN tobacco or as traditional tobacco may be performed by a machine learning algorithm. The trained machine learning algorithm may be able to take an image obtained from a hyperspectral camera and predict whether the tobacco that was imaged is VLN tobacco or traditional tobacco. In at least one example embodiment, the machine learning algorithm may be configured to classify tobacco in real time. For example, as tobacco is linearly moved underneath a hyperspectral camera, the tobacco may be classified by the machine learning algorithm. In at least one example embodiment, the machine learning algorithm may be implemented via the GUI 800.

The machine learning algorithm may include, for example, one or more of linear regression and/or logistic regression such as partial least squares regression, statistical clustering. Bayesian classification, decision trees, dimensionality reduction such as principal component analysis, and other types of machine learning models, such as expert systems, and/or combinations thereof, including ensemble techniques such as random forest. The machine learning algorithm may be used to provide various services such as an image classification, tobacco classification, and the like, and may be installed and executed in another electronic apparatus.

FIGS. 9-13 are a variety of graphs showing linear discriminant analyses of a variety of data used to train and test a machine learning algorithm. A first set of data includes 359 VLN tobacco bales and 83 traditional tobacco bales. The 359 VLN tobacco bales included 167 flue-cured bales and 192 burley bales. The 83 traditional bales were all burley bales. A second set of data includes 1211 VLN tobacco bales and 684 traditional tobacco bales. The 1211 VLN tobacco bales included 513 flue-cured bales and 698 burley bales. The 684 traditional bales included 311 flue-cured bales and 373 burley bales. Of the 698 VLN burley bales of the second set of data, 560 were Gen 2 and 138 were Gen 3. Of the 513 VLN flue-cured based of the second set of data, 370 were Gen 2 and 143 were Gen 3.

In at least one example embodiment, a data set including traditional and VLN tobacco may be used to train a machine learning algorithm as described above. The data set may be divided such that about 75% of the data is used as a training data set and about 25% of the data is used as a testing data set. For example, if a data set consisted of about 1895 observations, about 1420 of those observations may be used as a training data set and about 475 of those observations may be used as a testing data set. The training data set may be input into the machine learning algorithm with a known classification for each observation. By inputting observations with a known categorization of either VLN tobacco or traditional tobacco, the machine learning algorithm may be trained to determine whether an input image of tobacco should be classified as VLN tobacco or as traditional tobacco.

Once the machine learning algorithm has been trained with the training observations, the testing dataset may be input into the machine learning algorithm. The machine learning algorithm may receive the testing observations and may determine whether each testing observation should be categorized as VLN tobacco or as traditional tobacco. The classification of each of the testing observations may be known so that the classification completed by the machine learning algorithm can be validated. In at least one implementation of testing of the machine learning algorithm, the machine learning algorithm was able to correctly classify each of the observations of the training data set as VLN tobacco or traditional tobacco.

Figures 9, 10:
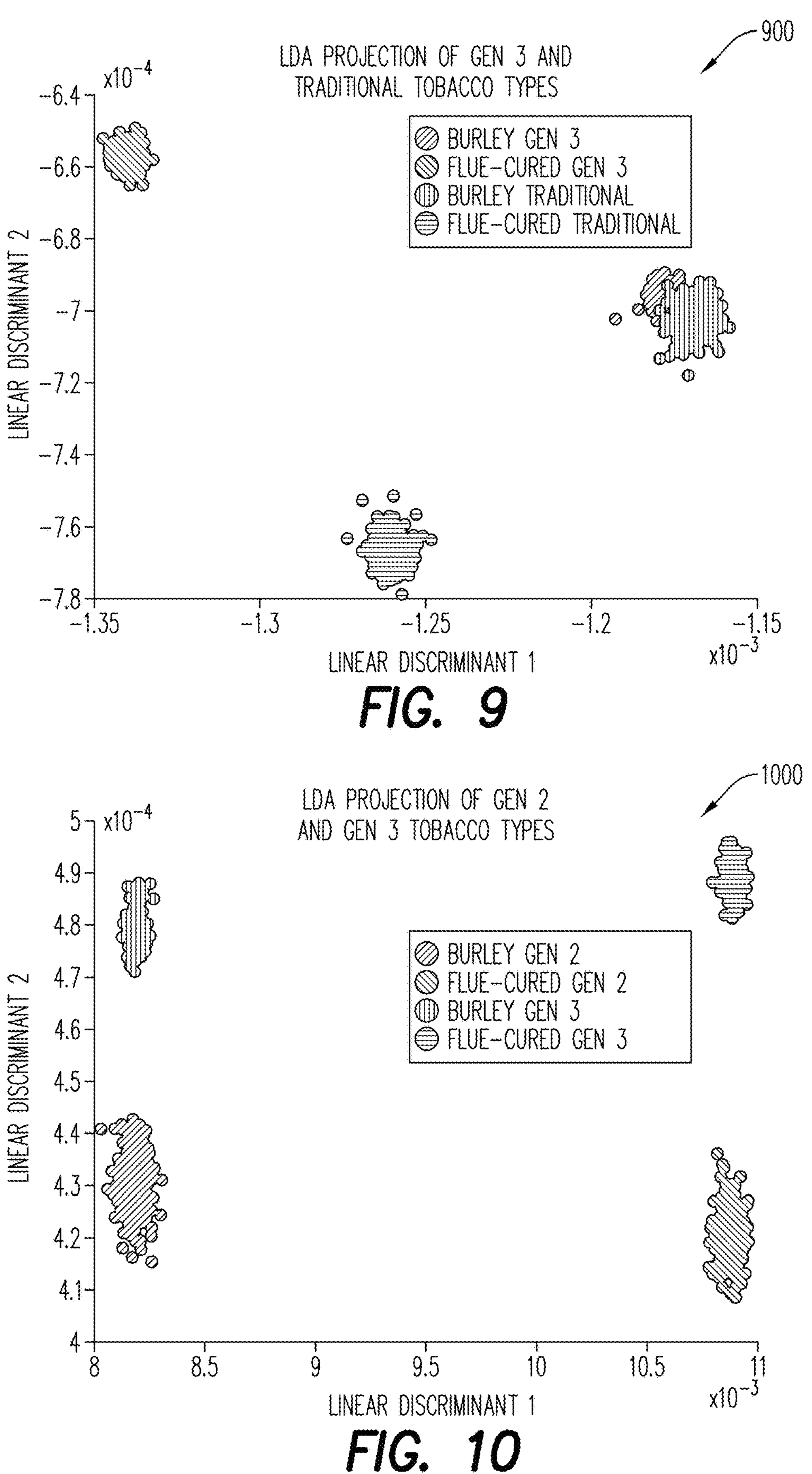
FIG. 9 is a graph of a linear discriminant analysis of data sets of different varieties of tobacco imaged via hyperspectral imaging according to an example embodiment.
FIG. 10 is a graph of a linear discriminant analysis of additional data sets of different varieties of tobacco imaged via hyperspectral imaging according to an example embodiment.

FIG. 9 shows a graph 900 of a linear discriminant analysis that was performed on a portion of the second set of data. FIG. 9 includes the VLN burley and flue-cured Gen 3 bale data as well as the traditional burley and flue-cured data. The VLN burley data is shown overlapping at least a portion of the traditional burley data in the graph 900.

FIG. 10 shows a graph 1000 of a linear discriminant analysis that was performed on a portion of the second set of data. FIG. 10 includes the VLN burley and flue-cured bale Gen 2 and Gen 3 data and does not include any traditional tobacco data. None of the VLN tobacco data is overlapping in the graph 1000.

Figure 11:
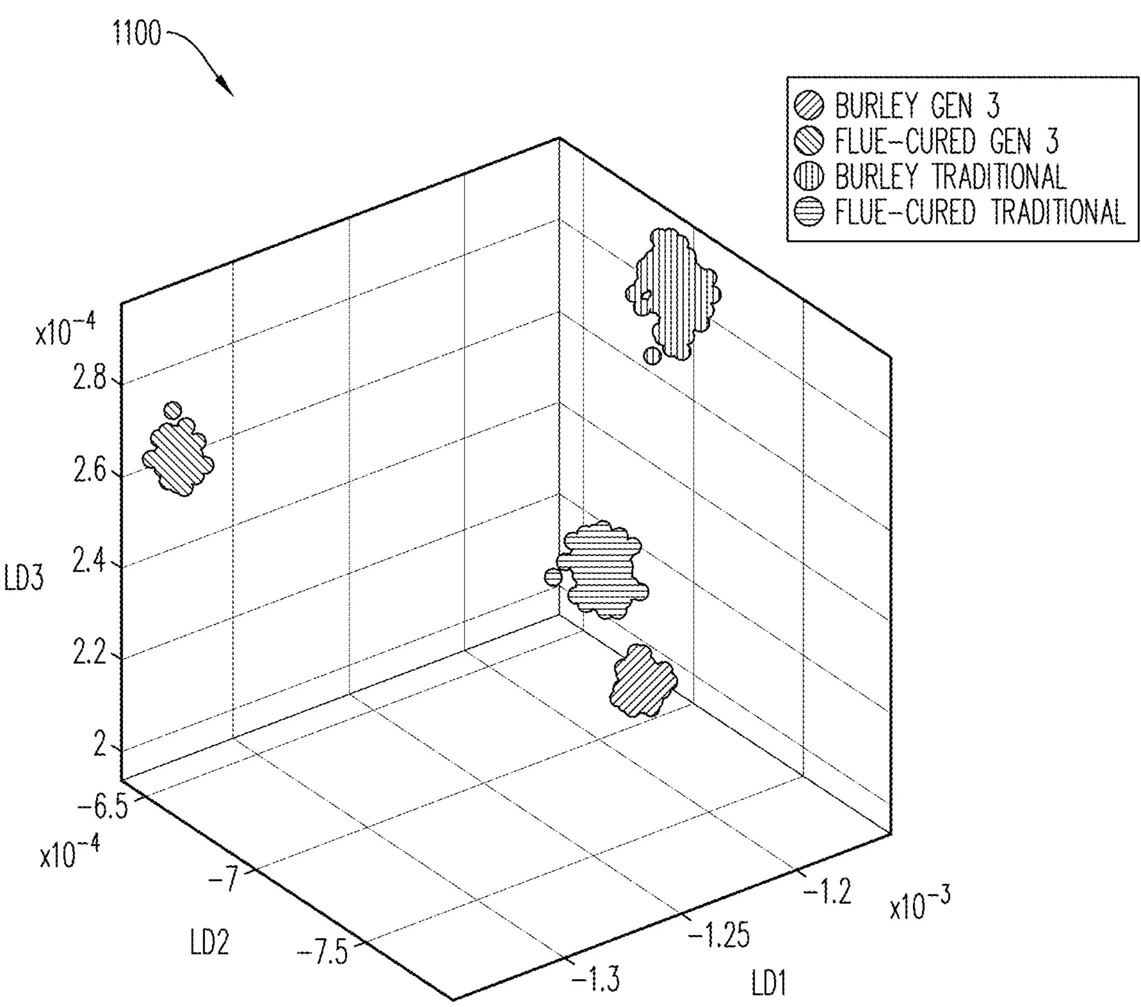
FIG. 11 is a three-dimensional graph of a linear discriminant analysis of data sets of different varieties of tobacco imaged via hyperspectral imaging according to an example embodiment.

FIG. 11 shows a graph 1100 of a linear discriminant analysis that introduces a third dimension. The graph 1100 may include the same data as the graph 900. With the third dimension introduced, there is a clear separation shown between each of the types of tobacco.

Figure 12:
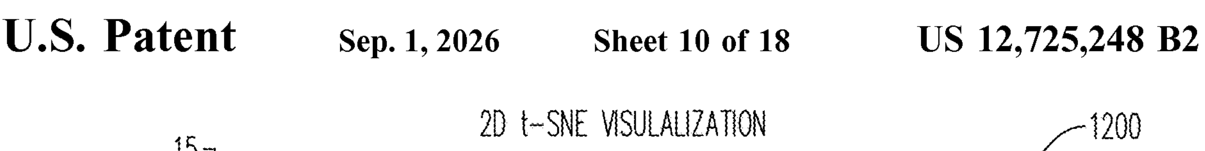
FIG. 12 is a graph of a t-distributed stochastic neighbor embedding (t-SNE) visualization of data set of VLN and traditional tobacco varieties imaged via hyperspectral imaging according to an example embodiment.
Figure 12:
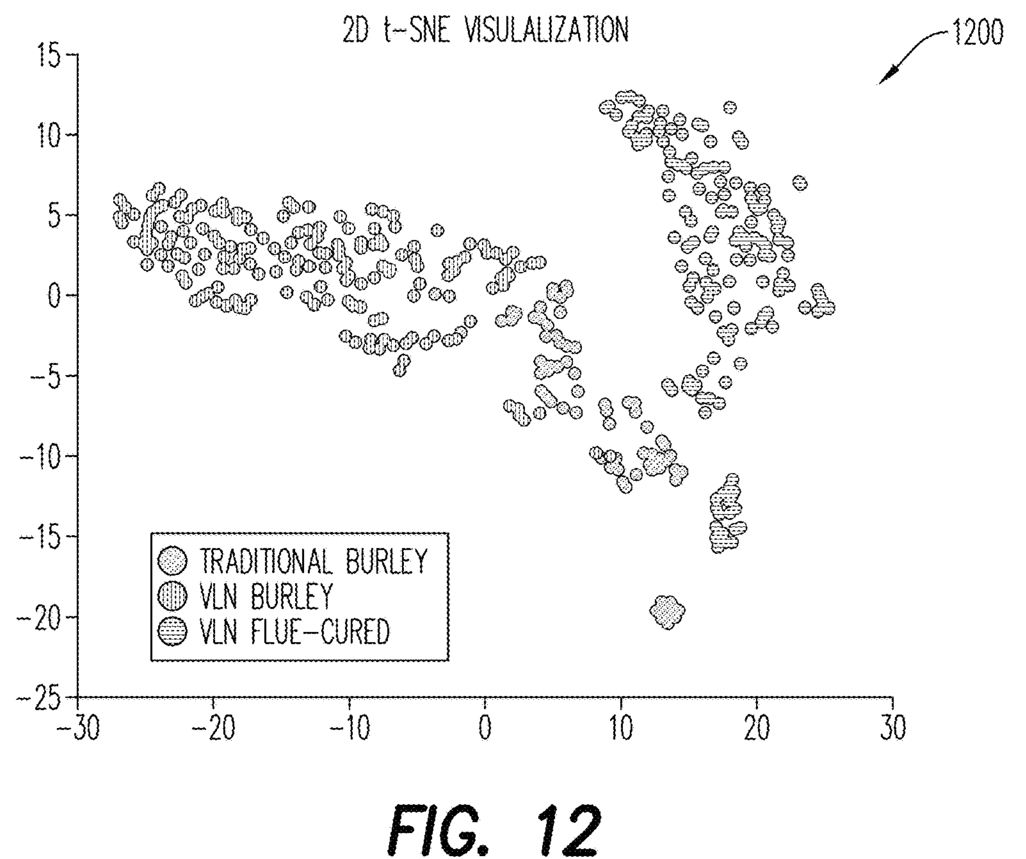

FIG. 12 shows a graph 1200 of a two dimensional t-distributed stochastic neighbor embedding (t-SNE) visualization of the first set of data. FIG. 12 includes the VLN burley and flue-cured data as well as the traditional data. The traditional data is shown to overlap at least in part with both the VLN burley and flue-cured data.

Figure 13:
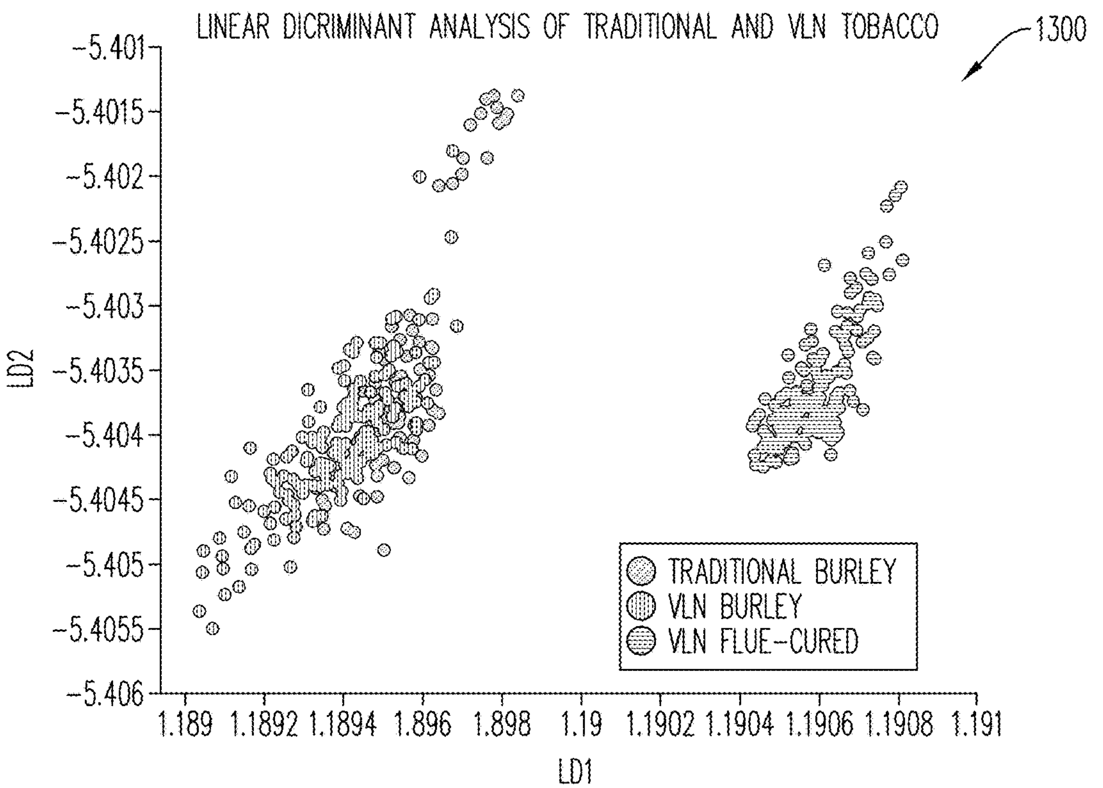
FIG. 13 is a graph of a t-distributed stochastic neighbor embedding (t-SNE) visualization of additional data sets of VLN and traditional tobacco varieties imaged via hyperspectral imaging according to an example embodiment.

FIG. 13 shows a graph 1300 of a linear discriminant analysis that was performed on the first set of data. FIG. 13 includes the VLN burley and flue-cured data as well as the traditional data. The traditional data is shown to overlap at least in part with both the VLN burley data and the VLN flue-cured data is distinct from the VLN burley and the traditional tobacco data. It should be appreciated that if a third dimension is introduced into the data visualizations shown in FIG. 12 or 13, similar to FIG. 11, each of the VLN burley data, the VLN flue-cured data, and the traditional tobacco data may be distinct and may not overlap.

The image processing system described herein may additionally be configured to analyze tobacco to determine an amount of nicotine in the tobacco.

Figure 14:
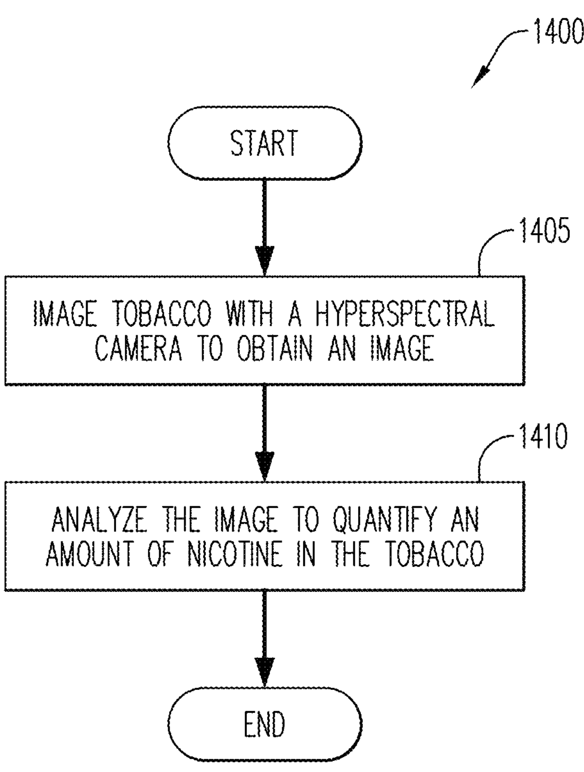
FIG. 14 is a flow chart of a method of analyzing tobacco to determine an amount of nicotine in tobacco according to an example embodiment.

FIG. 14 is a flow chart of a method 1400 of analyzing tobacco. In some embodiments, the tobacco to be analyzed may be in the form of a bale such as the tobacco bale 105. In other embodiments, the tobacco to be classified may be in a form other than a bale. The method 1400 may start when the tobacco is loaded onto the conveyor belt 110 to be imaged. At step 1405 the tobacco is imaged with the hyperspectral camera 120. An image of the tobacco may be obtained at the step 205 by the hyperspectral camera 120. After the image of the tobacco is obtained, the image is analyzed to quantify an amount of nicotine in the tobacco at step 1410. The method 1400 may be carried out by the system 300 as described above.

Figure 15:
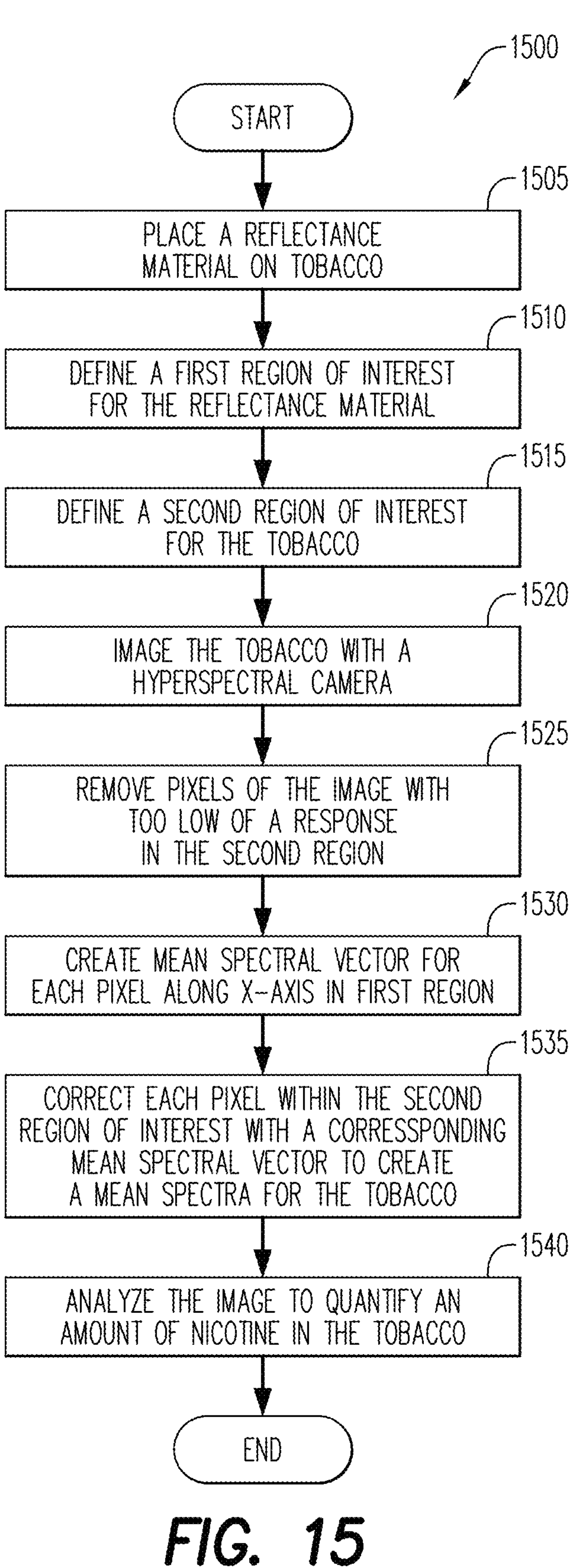
FIG. 15 is a flow chart of a method of analyzing tobacco to determine an amount of nicotine in tobacco according to an example embodiment.

FIG. 15 is a flow chart of a method 1500 of imaging and analyzing tobacco. The method 1500 may describe the method 1400 in additional detail. Steps 1505 through 1535 of the method 1500 may be the same as described above with reference to the steps 505 through 535 of FIG. 5. At step 1540, the tobacco may be analyzed to quantify an amount of nicotine in the tobacco. In at least one embodiment, the amount of nicotine in the tobacco may be determined based on the mean spectra determined at the step 1535.

The method 1500 may be a non-invasive way to analyze tobacco. The method 1500 may allow tobacco to be analyzed in real time. The method 1500 may ensure that tobacco is accurately priced and identified by the amount of nicotine in the tobacco for any future uses. For example, the method 1500 may allow tobacco to be sold, marketed, and/or used based on the amount of nicotine in the tobacco.

In at least one example embodiment, the GUI 800 may be adapted to implement at least a portion of the method 1500 of FIG. 15. As described above, the GUI 800 may show an image 805 that may have been captured by a hyperspectral camera. The GUI 800 may utilize a machine learning algorithm to output a level of nicotine in the tobacco that was imaged by the hyperspectral camera.

The machine learning algorithm may be configured to receive an image of tobacco and determine a level of nicotine in the tobacco. In at least one example embodiment, the machine learning algorithm may be configured to analyze tobacco in real time. For example, as tobacco is linearly moved underneath a hyperspectral camera, the tobacco may be analyzed by the machine learning algorithm.

The machine learning algorithm may include, for example, one or more of linear regression and/or logistic regression such as partial least squares regression, statistical clustering, Bayesian classification, decision trees, dimensionality reduction such as principal component analysis, and other types of machine learning models, such as expert systems, and/or combinations thereof, including ensemble techniques such as random forest. The machine learning algorithm may be used to provide various services such as an image classification, tobacco classification, and the like, and may be installed and executed in another electronic apparatus.

FIGS. 16-21 are a variety of charts and graphs analyzing a variety of data used to train and test the machine learning algorithm to determine an amount of nicotine in tobacco. In at least one example embodiment, the first data set and the second data set described above may be utilized to test and train the machine learning algorithm to determine an amount of nicotine in tobacco.

In at least one example embodiment, a data set including traditional and VLN tobacco may be used to train a machine learning algorithm as described above. The data set may be divided such that about 75% of the data is used as a training data set and about 25% of the data is used as a testing data set. For example, if a data set consisted of about 513 observations, about 385 of those observations may be used as a training data set and about 128 of those observations may be used as a testing data set. The training data set may be input into the machine learning algorithm with a known amount of nicotine for each observation. By inputting observations with a known amount of nicotine, the machine learning algorithm may be trained to determine an amount of nicotine in a sample of tobacco using any of the above described training methods.

Once the machine learning algorithm has been trained with the training observations, the testing dataset may be input into the machine learning algorithm. The machine learning algorithm may receive the testing observations and may determine an amount of nicotine in each testing observation. The amount of nicotine of each of the testing observations may be known so that the amount of nicotine by the machine learning algorithm can be validated. In at least one implementation of testing of the machine learning algorithm, the machine learning algorithm was able to correctly classify each of the observations of the training data set as VLN tobacco or traditional tobacco.

Figure 16:
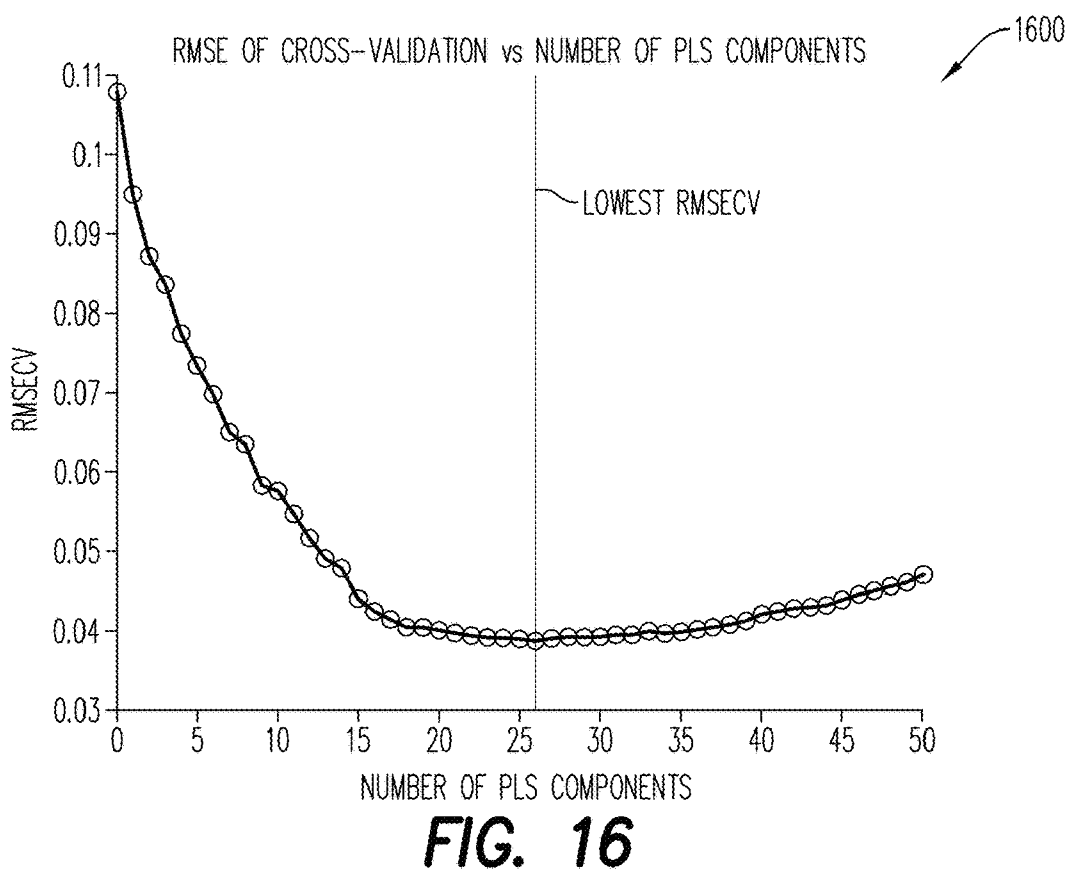
FIG. 16 is a graph showing root mean square error (RMSE) versus partial least squares (PLS) regression components of a data set of tobacco imaged via hyperspectral imaging according to an example embodiment.

FIG. 16 is a graph 1600 a partial least squares (PLS) regression of tobacco data such as the first set of data and/or the second set of data. As shown in FIG. 16, a number of PLS components is shown on an x-axis and a root mean square error of cross validation (RMSECV) is shown on a y-axis. The lowest RMSECV corresponds to approximately 26 PLS components.

Figure 17:
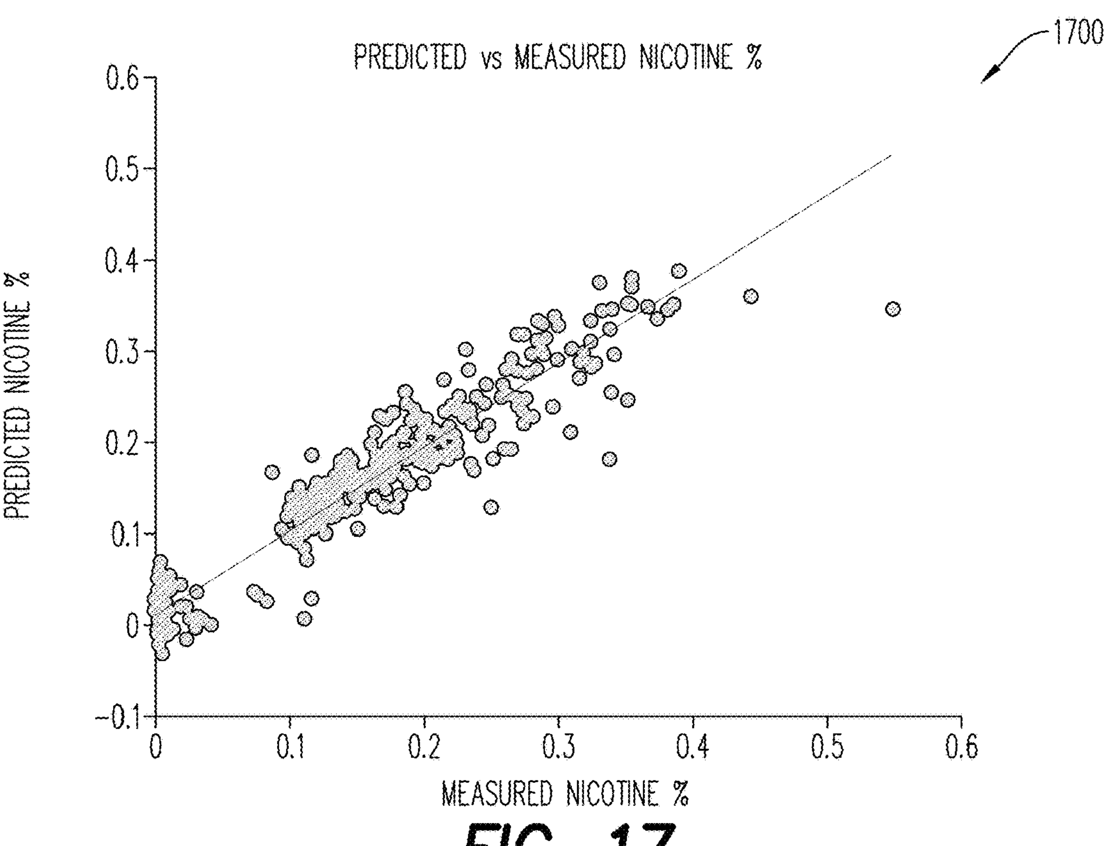
FIG. 17 is a graph showing a predicted nicotine percentage versus a measured nicotine percentage of a data set of tobacco imaged via hyperspectral imaging according to an example embodiment.

FIG. 17 is a graph 1700 of a partial least squares (PLS) regression of tobacco data such as the first set of data and/or the second set of data. As shown in FIG. 17, a measured nicotine percentage is shown on the x-axis and a predicted nicotine percentage is shown on a y-axis. In at least one example embodiment, the predicted nicotine percentage may be predicted by the machine learning algorithm.

In at least one example embodiment, using 26 PLS components resulted in a root mean square error (RMSE) of calibration of 0.0314, a RMSE of prediction of 0.0332, an $R^2$ of calibration of 0.915, and an $R^2$ of prediction of 0.894.

Figure 18:
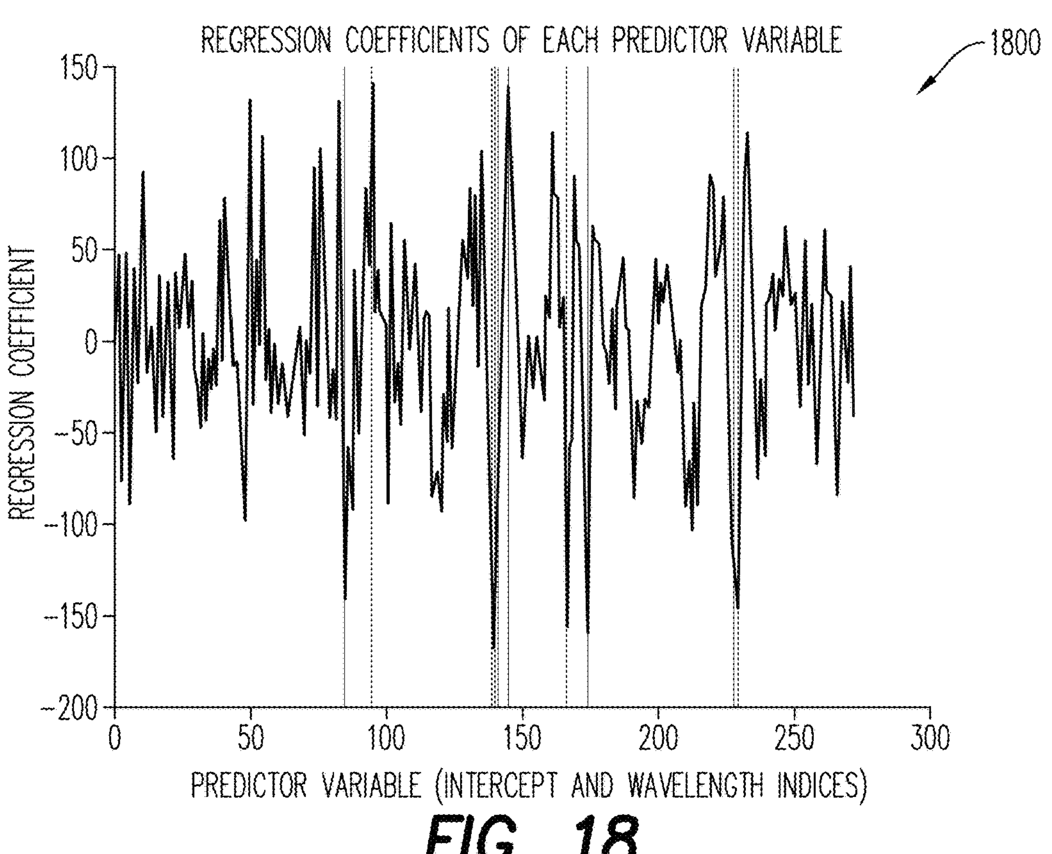
FIG. 18 is a graph showing a regression coefficient versus a predictor variable of a data set of tobacco imaged via hyperspectral imaging according to an example embodiment.
Figure 19:
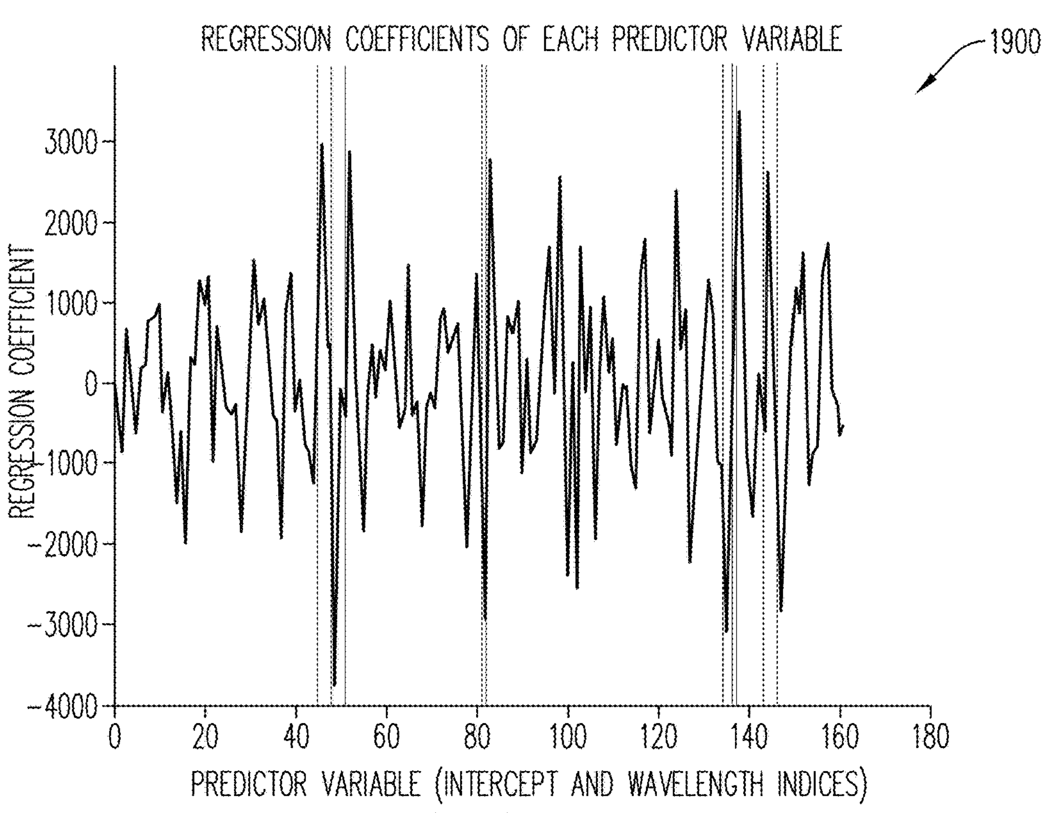
FIG. 19 is a graph showing a regression coefficient versus a predictor variable of another data set of tobacco imaged via hyperspectral imaging according to an example embodiment.

FIG. 18 is a graph 1800 of regression coefficients of each predictor variable for the second set of data. FIG. 19 is a graph 1900 of regression coefficients of each predictor variable for the first set of data. In both the graph of FIG. 18 and the graph of FIG. 19, a predictor variable which may relate to an intercept and wavelength index may be shown on the x-axis and a regression coefficient may be shown on the y-axis. In at least one example embodiment, the largest absolute coefficients may have the largest impact on a final model output. The top ten coefficients are marked with vertical lines through the graph.

Figures 20, 21:
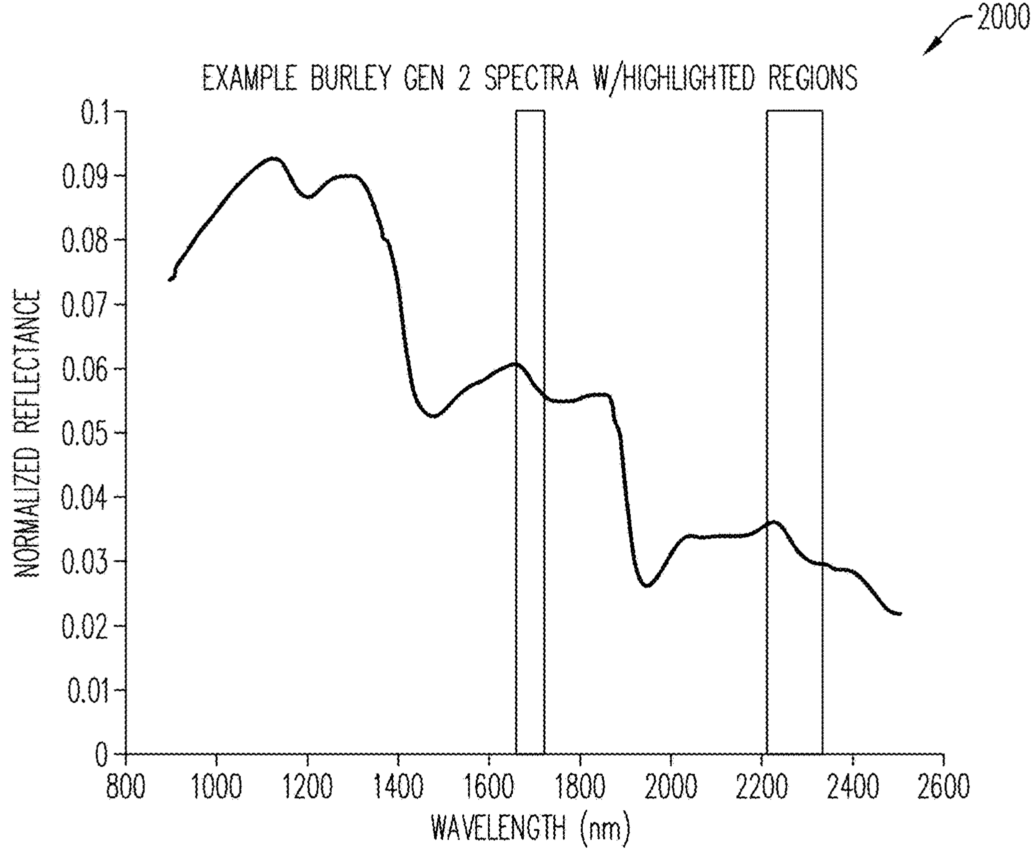
FIG. 20 is a graph of a spectral profile of a tobacco bale according to an example embodiment.
FIG. 21 is a chart of data included in the graph of FIG. 20.

FIG. 20 is a graph 2000 of an example spectra of the VLN burley data of both the first set of data and the second set of data. The graph 2000 includes two highlighted portions corresponding to different wavelength regions. The first highlighted portion corresponds to wavelengths between about 1700 nm and 1750 nm. The second highlighted portion corresponds to wavelengths between about 2200 nm and 2350 nm.

FIG. 21 is a chart 2100 of at least a portion of the data used to create the graph 2000 of FIG. 20. The first set of data may include about 160 spectral bands while the second set of data may include about 270 spectral bands. The first set of data and the second set of data were obtained by different hyperspectral cameras or images. The first set of data was obtained with a hyperspectral camera with about 160 spectral bands and the second set of data was obtained with a hyperspectral camera with about 270 spectral bands. As illustrated in the embodiment of FIG. 21, the systems and methods described herein for prediction and classification are robust and can be implemented with a variety of hardware. Thus, as technology advances, newer and more powerful systems with higher resolution may be used for classification and prediction.

The image processing system described herein may additionally be configured to analyze tobacco to determine an amount of at least one chemical constituent in the tobacco. In at least one example embodiment, the at least one chemical constituent may be at least one of propylene-glycol or glycerin. In other embodiments, additional chemical constituents may be analyzed in tobacco that is imaged by a hyperspectral camera.

Figure 22:
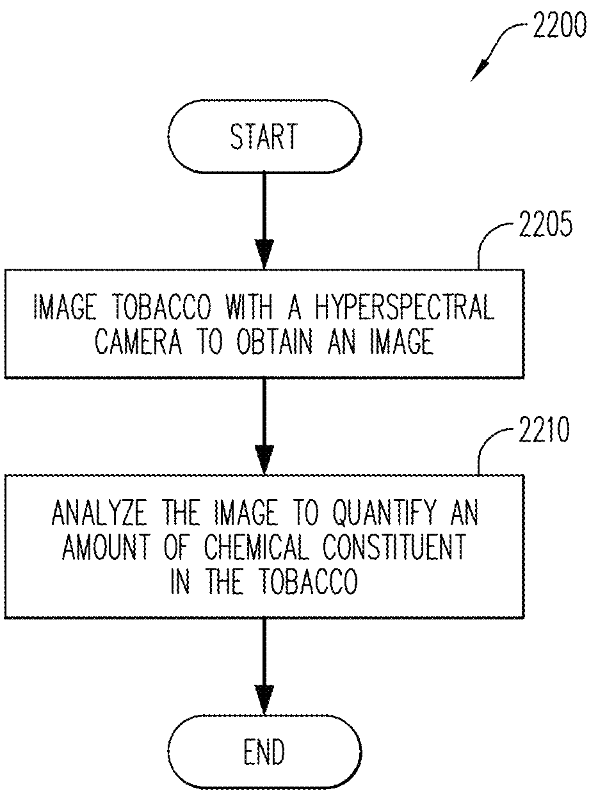
FIG. 22 is a flow chart of a method of analyzing tobacco to determine an amount of at least one chemical constituent in tobacco according to an example embodiment.

FIG. 22 is a flow chart of a method 2200 of analyzing tobacco. In some embodiments, the tobacco to be analyzed may be in the form of a bale such as the tobacco bale 105. In other embodiments, the tobacco to be classified may be in a form other than a bale. The tobacco may be a reconstituted tobacco product (RLD) that may be analyzed. The method 2200 may start when the tobacco is loaded onto the conveyor belt 110 to be imaged. At step 2205 the tobacco is imaged with the hyperspectral camera 120. An image of the tobacco may be obtained at the step 205 by the hyperspectral camera 120. After the image of the tobacco is obtained, the image is analyzed to quantify an amount of at least one chemical constituent in the tobacco at step 2210. The method 2200 may be carried out by the system 300 as described above.

Figure 23:
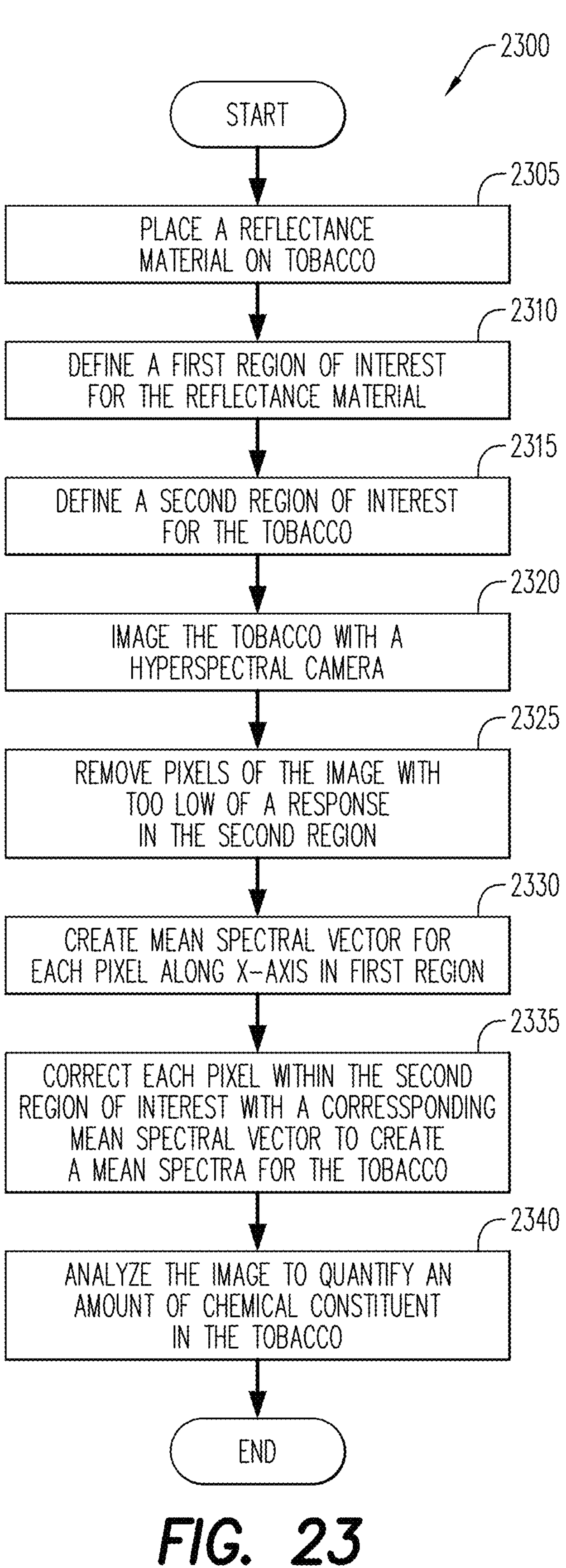
FIG. 23 is a flow chart of a method of analyzing tobacco to determine an amount of at least one chemical constituent in tobacco according to an example embodiment.

FIG. 23 is a flow chart of a method 2300 of imaging and analyzing tobacco. The method 2300 may describe the method 2200 in additional detail. Steps 2305 through 2335 of the method 2300 may be substantially as described above with reference to the steps 505 through 535 of FIG. 5. At step 2340, the tobacco may be analyzed to quantify an amount of at least one chemical constituent in the tobacco. In at least one embodiment, the amount of at least one chemical constituent in the tobacco may be determined based on the mean spectra determined at the step 2335.

The method 2300 may be a non-invasive way to analyze tobacco. The method 2300 may allow tobacco to be analyzed in real time. The method 2300 may ensure that tobacco contains appropriate amounts of chemical constituents which may ensure quality of the tobacco and may allow tobacco to be sold, marketed, and/or used based on the amount of one or more chemical constituents in the tobacco. The method 2300 may additionally be used in product development by utilizing the analysis of an amount of at least one chemical constituent to optimize the product.

In at least one example embodiment, the GUI 800 may be adapted to implement at least a portion of the method 2300 of FIG. 23. As described above, the GUI 800 may show an image 805 that may have been captured by a hyperspectral camera. The GUI 800 may utilize a machine learning algorithm to output a level of at least one chemical constituent in the tobacco that was imaged by the hyperspectral camera.

The machine learning algorithm may be configured to receive an image of tobacco and determine a level of at least one chemical constituent in the tobacco. In at least one example embodiment, the machine learning algorithm may be configured to analyze tobacco in real time. For example, as tobacco is linearly moved underneath a hyperspectral camera, the tobacco may be analyzed by the machine learning algorithm.

The machine learning algorithm may include, for example, one or more of linear regression and/or logistic regression such as partial least squares regression, statistical clustering, Bayesian classification, decision trees, dimensionality reduction such as principal component analysis, and other types of machine learning models, such as expert systems, and/or combinations thereof, including ensemble techniques such as random forest. The machine learning algorithm may be used to provide various services such as an image classification, tobacco classification, and the like, and may be installed and executed in another electronic apparatus.

In at least one example embodiment, the machine learning algorithm may be trained with a dataset that includes 130 unique sets of spectra. The 130 unique sets may include 10 images of a base sheet, 40 images of LW 0488, 40 images of MH 0808, and 40 images of MH 0809. There may be two images obtained per each sample of the 40 images of LW 0488, the 40 images of MH 0808, and the 40 images of MH 0809.

About 100 of the 130 unique sets may be used as training data and about 30 of the unique sets may be used as testing data when the images of the base sheet are included. When the images of the base sheet are excluded, about 93 of the 130 unique sets may be used as training data and about 27 of the unique sets may be used as testing data. In at least one example embodiment, the machine learning algorithm may be trained using a leave-one-out method of cross validation. Additionally, the machine learning algorithm may be trained using a wide range of latent variables. A variable with the lowest cross-validation error may be selected as a final parameter to train and test the machine learning algorithm.

In at least one example embodiment, there may be at least 14 latent variables. Using the variable with the lowest cross-validation error, the following training data may result for a propylene-glycol chemical constituent: a root mean square error (RMSE) of calibration of 0.0533, a RMSE of prediction of 0.0952, an $R^2$ of calibration of 0.981, an $R^2$ of prediction of 0.921, an RPD of calibration of 4.82, an RPD of prediction of 3.61, and a RMSE cross-validation of 0.0799. Using the variable with the lowest cross-validation error, the following training data may result for a glycerin chemical constituent: a root mean square error (RMSE) of calibration of 0.0586, a RMSE of prediction of 0.0969, an $R^2$ of calibration of 0.972, an $R^2$ of prediction of 0.900, an RPD of calibration of 4.09, an RPD of prediction of 3.22, and a RMSE cross-validation of 0.0864.

Figure 24:
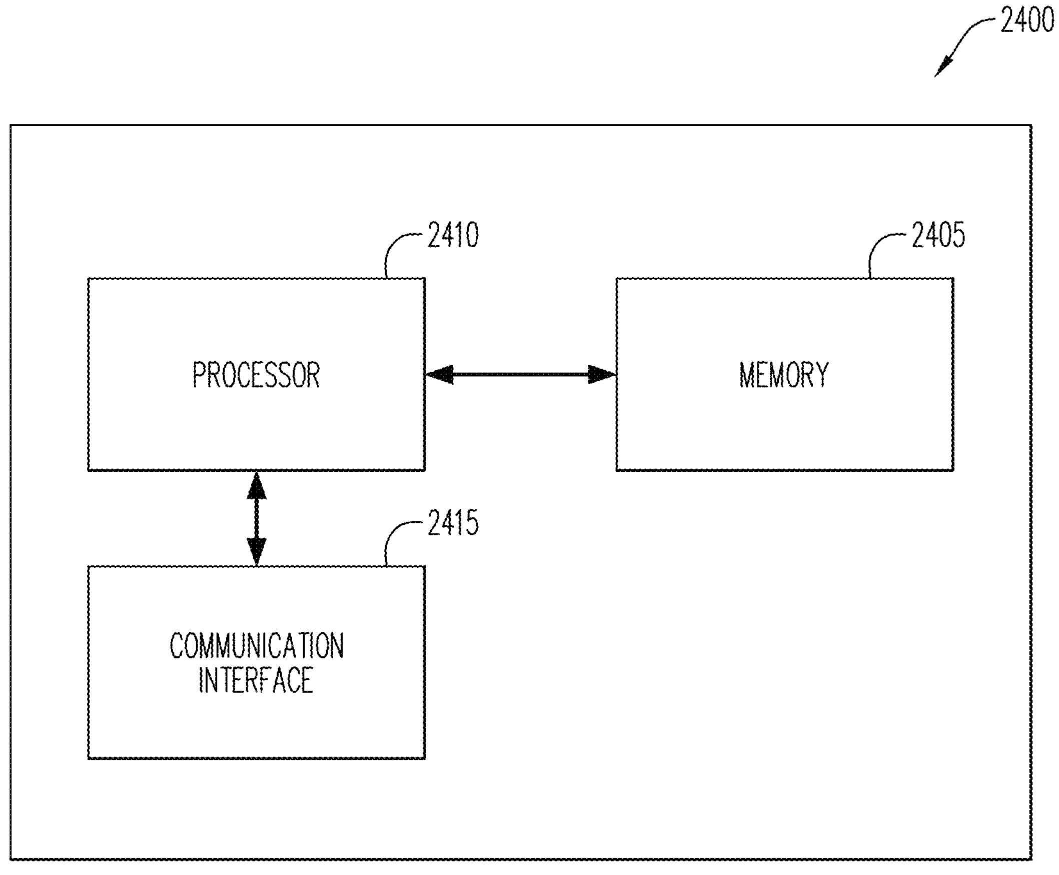
FIG. 24 is a block diagram of a computer system used to implement any of the methods described herein according to an example embodiment.

FIG. 24 illustrates an example embodiment of a computer system 2400 that may analyze any of the hyperspectral images described above. In some embodiments, the computer system 2400 may be the system 300 or the image processing system described above. The structure shown in FIG. 2400 may also be representative of other computer elements of the embodiments described above.

As shown, the computer system 2400 may include a memory 2405, a processor 2410 connected to the memory 2405, and at least one communication interface 2415 connected to the processor 2410. The at least one communication interface 2415 may constitute a transceiver for transmitting/receiving data from/to other computer elements. As will be appreciated, depending on the implementation of the computer system 2400, the computer system 2400 may include additional conventional components. For example purposes, the example embodiment shown in FIG. 2400 will be discussed with regard to the processor 2410. However, it should be understood that the computer system 2400 shown in FIG. 24 may include one or more processors or other processing circuitry, such as one or more Application Specific Integrated Circuits (ASICs).

The memory 2405 may be a computer readable storage medium that generally includes a random access memory (RAM), read only memory (ROM), and/or a permanent mass storage device, such as a disk drive. The memory 2405 may also store an operating system and any other routines/modules/applications for providing the functionalities of the network node (including UPF, CPF, MPF, etc.) to be executed by the processor 2410. These software components may also be loaded from a separate computer readable storage medium into the memory 2405 using a drive mechanism (not shown). Such separate computer readable storage medium may include a disc, tape, DVD/CD-ROM drive, memory card, or other like computer readable storage medium (not shown). In some example embodiments, software components may be loaded into the memory 2405 via one of the at least one communication interface 2415, rather than via a computer readable storage medium.

The processor 2410 or other processing circuitry may be configured to carry out instructions of a computer program by performing the arithmetical, logical, and input/output operations of the system. Instructions may be provided to the processor 2410 by the memory 2405.

The at least one communication interface 2415 may be wired and may include components that interface the processor 2410 with the other input/output components. As will be understood, the at least one communication interface 2415 and programs stored in the memory 2405 to set forth the special purpose functionalities of the computer will vary depending on the implementation of the computer.

The at least one communication interface 2415 may also include one or more user input devices (e.g., a keyboard, a keypad, a mouse, or the like) and user output devices (e.g., a display, a speaker, or the like).

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A method of classifying tobacco, the method comprising:

placing a reflectance material on the tobacco for use in preprocessing;

imaging tobacco with a hyperspectral imaging system comprising a hyperspectral camera and an image processing system to obtain an image;

defining a first region of interest for the reflectance material;

defining a second region of interest for the tobacco;

after the image is obtained by the hyperspectral camera, removing pixels with a response less than a threshold response within the second region of interest;

creating a mean spectral vector for each pixel along an x-axis of the first region of interest by averaging the first region of interest along a y-axis corresponding to each pixel along the x-axis; and classifying the tobacco as very low nicotine (VLN) or traditional based on the obtained image and the mean spectral vector.

2. The method of claim 1, further comprising:

placing the tobacco on a conveyor belt configured to pass underneath the hyperspectral camera.

3. The method of claim 2, wherein the imaging the tobacco occurs while the tobacco is moved linearly underneath the hyperspectral camera via the conveyor belt and movement of the tobacco is tracked by the image processing system to provide a consistent image.

4. The method of claim 2, wherein the classifying the tobacco includes analyzing the image in real time as the tobacco is moved linearly underneath the hyperspectral camera.

5. The method of claim 1, wherein the hyperspectral camera is configured to image the tobacco with shortwave infrared (SWIR) imaging.

6. The method of claim 5, wherein the SWIR imaging operates between 900 nanometers (nm) and 2500 nm.

7. The method of claim 1, wherein the classifying includes extracting relevant features from the obtained image.

8. The method of claim 1, wherein the classifying is performed by a machine learning algorithm.

9. The method of claim 8, wherein the machine learning algorithm is at least one of logistic regression or linear discriminant analysis.

10. The method of claim 8, further comprising:

training the machine learning algorithm via a plurality of images of tobacco with a known classification of VLN tobacco or traditional tobacco.

11. The method of claim 1, wherein the hyperspectral camera images the tobacco to construct a two-dimensional image of a surface of the tobacco for each spectral wavelength captured by the hyperspectral camera.

12. The method of claim 1, wherein the image includes a plurality of pixels, each of the plurality of pixels includes a plurality of spectral measurements.

13. The method of claim 12, wherein each of the plurality of pixels includes at least 160 spectral measurements, the at least 160 spectral measurements being defined by the hyperspectral camera.

14. The method of claim 1, wherein the classifying the tobacco as VLN or traditional is non-invasive.

15. The method of claim 1, wherein a rectangular area of the tobacco is imaged by the hyperspectral camera.

16. The method of claim 15, wherein the rectangular area is a 12" by 30" area.

17. The method of claim 1, further comprising:

correcting each of the pixels within the second region of interest with the mean spectral vector to create a mean spectra for the tobacco.

18. The method of claim 17, wherein the tobacco is classified as VLN or traditional based on the mean spectra for the tobacco.

19. The method of claim 17, wherein the correcting each of the pixels within the second region of interest includes discarding a pixel of the second region of interest if there is no corresponding element of the mean spectral vector.

* * * * *